(12) United States Patent
Kato

(10) Patent No.: US 8,075,946 B2
(45) Date of Patent: Dec. 13, 2011

(54) DISCHARGE METHOD, COLOR FILTER MANUFACTURING METHOD, ELECTRO-OPTICAL APPARATUS, AND ELECTRONIC DEVICE

(75) Inventor: Tsuyoshi Kato, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 720 days.

(21) Appl. No.: 11/594,101

(22) Filed: Nov. 8, 2006

(65) Prior Publication Data

US 2007/0111626 A1    May 17, 2007

(30) Foreign Application Priority Data

Nov. 11, 2005 (JP) ................................. 2005-327924
Sep. 5, 2006 (JP) ................................. 2006-239879

(51) Int. Cl.
*B05D 5/06* (2006.01)
(52) U.S. Cl. ................... 427/162; 347/1; 347/5; 347/10
(58) Field of Classification Search .................. 427/162; 347/1, 5, 10
See application file for complete search history.

(56) References Cited

U.S. PATENT DOCUMENTS

| | | | |
|---|---|---|---|
| 5,847,723 A * | 12/1998 | Akahira et al. ................. | 347/14 |
| 6,974,198 B2 | 12/2005 | Usuda | |
| 6,991,315 B2 | 1/2006 | Nakamura et al. | |
| 2005/0122351 A1 * | 6/2005 | Yamazaki et al. ................. | 347/5 |

FOREIGN PATENT DOCUMENTS

| | | |
|---|---|---|
| JP | 2003-159787 A | 6/2003 |
| JP | 2003-255123 A | 9/2003 |
| JP | 2004-290799 A | 10/2004 |
| JP | 2005-087801 A | 4/2005 |
| JP | 2005-218984 A | 8/2005 |
| JP | 2005-305242 A | 11/2005 |
| KR | 2003-0043671 A | 6/2003 |
| KR | 2004-0012502 A | 2/2004 |

* cited by examiner

*Primary Examiner* — Timothy Meeks
*Assistant Examiner* — Elizabeth Burkhart
(74) *Attorney, Agent, or Firm* — Global IP Counselors, LLP

(57) ABSTRACT

A discharge method is provided to discharge a liquid containing a functional material from a plurality of nozzles of a droplet discharge head to a plurality of film formation regions of a discharge medium in synchronization with a relative movement of the discharge medium and the droplet discharge head. The discharge method includes performing a first discharge step in which the liquid is discharged from a plurality of nozzles in a nozzle row so that the liquid is not discharged simultaneously from adjacent nozzles positioned over the film formation regions, and performing a second discharge step in which the liquid is discharged from a plurality of nozzles in the nozzle row in a different combination from the nozzles used in the first discharging step so that the liquid is not discharged simultaneously from adjacent nozzles positioned over the film formation regions.

13 Claims, 15 Drawing Sheets

DISCHARGE METHOD, COLOR FILTER MANUFACTURING METHOD, ELECTRO-OPTICAL APPARATUS, AND ELECTRONIC DEVICE

CROSS-REFERENCE TO RELATED APPLICATIONS

This application claims priority to Japanese Patent Application Nos. 2005-327924 filed on Nov. 11, 2005 and 2006-239879 filed on Sep. 5, 2006. The entire disclosures of Japanese Patent Application Nos. 2005-327924 and 2006-239879 are hereby incorporated herein by reference.

BACKGROUND OF THE INVENTION

1. Field of the Invention

The present invention relates to a discharge method for discharging a liquid having fluidity, and to a method for manufacturing a color filter in which this discharge method is used, to an electro-optical apparatus, and to an electronic devise.

2. Background Information

Japanese Laid-Open Patent Application No. 2003-159787 discloses a conventional discharge method for discharging a liquid having fluidity. More specifically, this reference discloses a method for manufacturing a color filter by discharging a liquid containing a color filter material onto a substrate.

With the above-mentioned color filter manufacturing method, a plurality of droplet discharge heads having a plurality of nozzles capable of discharging a liquid in the form of droplets are arranged in a specific direction across from a substrate. The substrate and the droplet discharge heads are moved relative to one another in a state in which no liquid is discharged from nozzles located in a specific region at the ends of the nozzle row (unused nozzles), while the liquid is suitably discharged from the nozzles (used nozzles) to specific locations on the substrate, thereby forming a color filter. As a result, the liquid is discharged without using nozzles with a relatively large discharge amount located in a specific region at the ends of the nozzle row, so the liquid is discharged more evenly.

Also, aside from color filters, Japanese Laid-Open Patent Application No. 2004-290799 discloses a conventional liquid discharge apparatus and a method for manufacturing a device, in which a liquid having fluidity is discharged so as to form a functional thin-film in a fine and precise pattern on a substrate.

With this method for manufacturing a device, the behavior of the liquid droplets as they land on the substrate is continuously monitored with a camera provided to the droplet discharge apparatus, and the optimal liquid discharge conditions can be determined on the basis of these results.

The amount of liquid discharged from the plurality of nozzles of the above-mentioned droplet discharge heads varied in actual practice from nozzle to nozzle. If this variance was large, it resulted in unevenness in the thin-film formed after discharge, so the problem with a color filter, for example, was uneven color.

An example of the cause of this variance in the amount of discharge between nozzles is what is known as electrical crosstalk, in which there is variance in the drive voltage between adjacent nozzles when drive voltage is applied to an energy generation unit (such as a piezoelectric element or a heating element) used for discharging liquid in the form of droplets from the nozzles. Another example is what is known as mechanical crosstalk, in which variance occurs when the liquid is supplied, such as shape variance in the channel through which the liquid is supplied, and the speed or pressure at which the droplets are discharged varies between nozzles.

The present invention was conceived in light of these problems, and it is an object thereof to provide a discharge method with which variance can be reduced in the amount of discharge between adjacent nozzles, and a liquid can be discharged in a consistent amount, as well as a color filter manufacturing method, electro-optical apparatus, and electronic device that make use of this discharge method.

In view of the above, it will be apparent to those skilled in the art from this disclosure that there exists a need for an improved discharge method for discharging a liquid having fluidity. This invention addresses this need in the art as well as other needs, which will become apparent to those skilled in the art from this disclosure.

SUMMARY OF THE INVENTION

In accordance with one aspect of the present invention, a discharge method is provided in which a liquid containing a functional material is discharged from a plurality of nozzles of a droplet discharge head to film formation regions of a discharge medium in synchronization with the relative movement of the discharge medium and the droplet discharge head, comprising a first discharge step of performing discharge by selecting the nozzles to be used from among a nozzle row consisting of the plurality of nozzles, so that the liquid is not discharged simultaneously from adjacent nozzles positioned over the film formation regions, and a second discharge step of performing discharge by selecting a combination of nozzles different from that in the first discharge step, so that the liquid is not discharged simultaneously from adjacent nozzles positioned over the film formation regions.

The amount of liquid discharged from the plurality of nozzles of a droplet discharge head varies from nozzle to nozzle because of electrical or mechanical crosstalk. With this method, in the first discharge step, a liquid containing a functional material is discharged to the film formation regions of a discharge medium by selecting the nozzles to be used from among a nozzle row, so that the liquid is not discharged simultaneously from adjacent nozzles positioned over the film formation regions. In the second discharge step, discharge is performed by selecting a combination of nozzles different from that in the first discharge step, so that the liquid is not discharged simultaneously from adjacent nozzles positioned over the film formation regions. Therefore, liquid is never discharged simultaneously from adjacent nozzles positioned over the film formation regions in any single discharge. Also, the combination of nozzles out of the nozzle row from which the liquid is discharged is different in the former and latter discharges. Thus, compared to when the liquid is discharged simultaneously from adjacent nozzles, electrical or mechanical crosstalk is less likely to occur, so variance can be reduced between adjacent nozzles. Specifically, with this discharge method, the liquid is discharged in a consistent amount, allowing a uniform film composed of a functional material to be formed in the film formation regions.

Also, the surface of the discharge medium has a partition component that divides the surface into a plurality of film formation regions, and in the first discharge step and the second discharge step, if the selected nozzles is positioned over the partition component, those nozzles are not used.

With this method, in the first discharge step and the second discharge step, if the selected nozzles is positioned over the partition component, those nozzles are not used. Therefore, the discharge is performed such that the discharged liquid is less apt to hit the partition component. Thus, it is possible to minimize the fluctuation of the desired discharge amount, without the liquid discharged from the nozzles hitting the partition component and being held in the film formation regions. Specifically, a more uniform film composed of a functional material can be formed in the film formation regions.

Also, in accordance with another aspect of the present invention, if the liquid is discharged as droplets from the selected nozzles and discharged to the film formation regions, and the discharged droplets will touch the partition component, the nozzles that discharge said droplets are preferably not used. As a result, since the discharged droplets are used as a reference, the discharged liquid can be prevented more accurately from hitting the partition component than when the size of the nozzles is used as a reference to determine whether or not the droplets will hit the partition component. Specifically, if this discharge method is used, the liquid will be discharged in a more consistent amount, and a more uniform film composed of a functional material can be formed in the film formation regions.

Also, the droplet discharge head has a plurality of energy generation units for discharging the liquid as droplets from the plurality of nozzles, and the plurality of energy generation units are electrically connected to a head drive means for generating a drive waveform at a specific period, and in the first discharge step and the second discharge step, drive waveforms that differ in time series are successively selected and applied from the head drive means to the energy generation units corresponding to the nozzles to be used, and the droplets are discharged.

With this method, in the first discharge step and the second discharge step, drive waveforms that differ in time series are successively selected and applied from the head drive means to the energy generation units corresponding to the nozzles to be used, and the droplets are discharged. Therefore, the same drive waveforms are not applied in time series to energy generation units of adjacent nozzles. Thus, no electrical crosstalk occurs between nozzles, so variance in the discharge amount caused by electrical crosstalk can be minimized.

Also, the constitution may be such that the droplet discharge head has a plurality of energy generation units for discharging the liquid as the droplets from the plurality of nozzles, the plurality of energy generation units are electrically connected to a head drive means for generating a plurality of drive waveforms at a single period, and in the first discharge step and the second discharge step, drive waveforms that differ in time series from out of the plurality of drive waveforms are successively selected and applied from the head drive means to the energy generation units corresponding to the nozzles to be used, and the droplets are discharged.

With this method, in the first discharge step and the second discharge step, drive waveforms that differ in time series from out of the plurality of drive waveforms are successively selected and applied from the head drive means to the energy generation units corresponding to the nozzles to be used, and the droplets are discharged. Therefore, the same drive waveforms will not be applied in time series to adjacent energy generation units. Thus, no electrical crosstalk occurs between nozzles, so variance in the discharge amount caused by electrical crosstalk can be minimized. Furthermore, since a plurality of drive waveforms are produced in a single period, at least up to the second discharge can be performed within one period. Also, even more discharges (beyond two) can be carried out within one period by varying the discharge frequency. Specifically, liquid can be discharged in a specific amount to the film formation regions in a shorter time.

Also, the first discharge step and the second discharge step are performed on the same film formation region. This results in the liquid being discharged in a consistent amount within the same film formation region, so film formation unevenness caused by unevenness in the discharge amount within the same film formation region can be reduced.

In accordance with further another aspect of the present invention, a discharge method is provided in which a liquid is discharged from a plurality of nozzles onto a discharge medium under relative scanning of the discharge medium and a nozzle row having the nozzles, wherein the liquid is discharged at a timing synchronized to the scanning, in group units made up of nozzles that are at least not adjacent to each other and included in the nozzle row, and the timing varies between a plurality of the groups.

With this discharge method, adjacent nozzles belong to different groups do not perform discharge at the same time, which affords an overall reduction in mechanical crosstalk. As a result, there is relatively less variance in the characteristics between nozzles attributable to crosstalk, and the liquid can be discharged in a consistent amount.

Also, in the discharge method discussed above, the nozzle row has three or more of the groups. With this discharge method, since the nozzle row has three or more groups, the average nozzle spacing per group can be increased, and this further reduces mechanical crosstalk.

Also, in the discharge method discussed above, the groups are constituted such that the number of nozzles that make up the groups are substantially equal among the plurality of groups. If the number of constituent nozzles, or their density of distribution, is not uniform between groups, there will be a difference in the effect of mechanical and electrical crosstalk between nozzles, resulting in a variance in the discharge amount. This problem can be avoided with this discharge method.

Also, in accordance with further another aspect of the present invention a discharge method is provided in which the liquid is discharged by selecting and supplying some of the plurality of drive waveforms produced by time division, to energy generation units disposed within the nozzles, wherein the drive waveforms are selected so that the drive waveforms selected according to the groups do not overlap each other between the plurality of groups. With this method, the timing can be varied from group to group with a single drive supply system, so the above-mentioned effects can be obtained with a simple hardware configuration.

Also, in the above-mentioned discharge method, the drive waveforms are selected so that the drive waveforms that can be selected according to the groups form a periodic timing. With this discharge method, the liquid is discharged at a periodic timing for one nozzle, so the discharge conditions will be uniform between timing cycles, and the droplet amount can be kept consistent in the scanning direction.

Also, in the above-mentioned discharge method, the drive waveforms are selected so that the drive waveforms that can be selected according to the groups form a non-periodic timing. With this discharge method, the discharge conditions are different for each discharge timing, which results in fluctuation in the discharge amount (amount of liquid disposed) in the scanning direction. As a result, any unevenness in the disposed amount attributable to variance in the characteristics between nozzles is added to the unevenness of the component perpendicular to this, thereby forming unevenness that is dispersed two-dimensionally. Since this two-dimensionally dispersed unevenness is less visible than streaked (one-dimensional) unevenness, the end result is that the unevenness does not stand out as much.

In accordance with further another aspect of the present invention, a method is provided for manufacturing a color filter having a partition component that divides a substrate into a plurality of film formation regions, and a plurality of types of color element in the plurality of film formation regions, wherein the above-mentioned discharge method of the present invention is used, and a plurality of types of liquid containing different color element formation materials are discharged as functional materials from a plurality of nozzles of a droplet discharge head into the plurality of film formation regions, thereby forming a plurality of types of color element.

With this method, the liquid is discharged in a consistent amount, and a uniform film composed of a functional material can be formed in the film formation regions, so it is possible with this method to manufacture a color filter in which a plurality of types of color element have been uniformly formed.

In accordance with further another aspect of the present invention, the electro-optical apparatus is provided that includes a color filter manufactured with the above-mentioned method for manufacturing a color filter of the present invention. Since this apparatus is equipped with a color filter in which a plurality of types of color element have been uniformly formed, it is possible to provide an electro-optical apparatus with high display quality and little color unevenness or other such problems.

In accordance with further another aspect of the present invention, the electronic device is provided that is equipped with the above-mentioned electro-optical apparatus of the present invention. As a result, since it is equipped with an electro-optical apparatus with high display quality and little color unevenness or other such problems, it is possible to provide an electronic device capable of an attractive color display.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

The embodiments of the present invention will be described, using as examples a method for manufacturing a color filter featuring a droplet discharge apparatus equipped with a droplet discharge head that discharges a liquid as droplets from nozzles, and a liquid crystal display device (as an electro-optical apparatus featuring this color filter), and a portable information processing device (as an electronic device in which this liquid crystal display device is installed).

First Embodiment

Droplet Discharge Apparatus

Figure 1:
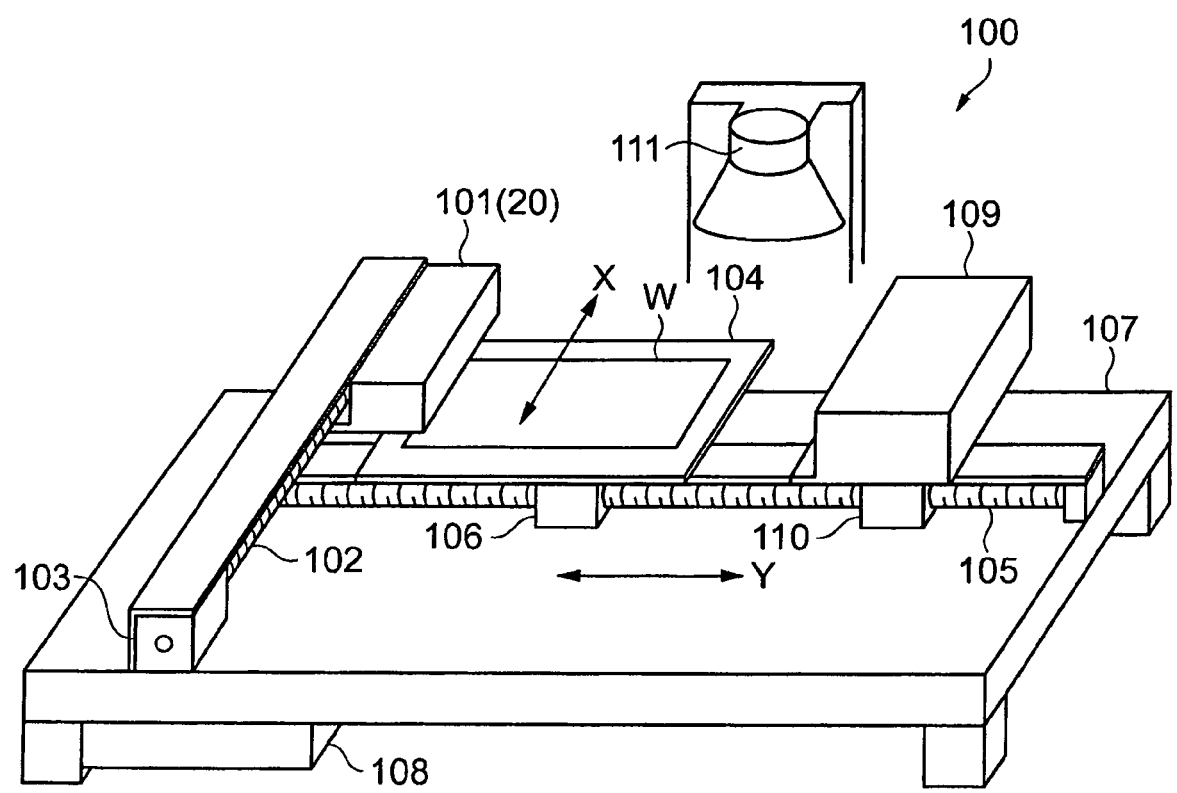
FIG. 1 is a simplified perspective view of a droplet discharge apparatus.

First, the droplet discharge apparatus will be described through reference to FIGS. 1 to 3. FIG. 1 is a simplified perspective view of a droplet discharge apparatus.

As shown in FIG. 1, a droplet discharge apparatus 100 discharges a liquid in the form of droplets, and forms a film composed of this liquid on a workpiece W. This apparatus is also equipped with a stage 104 on which the workpiece W is placed, and a head unit 101 having a plurality of droplet discharge heads 20 (see FIG. 2) that discharge the liquid as droplets onto the workpiece W.

The droplet discharge apparatus 100 further comprises an X direction guide shaft 102 for driving the head unit 101 in the sub-scanning direction (X direction), and an X direction drive motor 103 for rotating the X direction guide shaft 102. It further comprises a Y direction guide shaft 105 for guiding the stage 104 in the main scanning direction (Y direction), and a Y direction drive motor 106 for engaging with and rotating the Y direction guide shaft 105. Also provided is a stand 107 on top of which are installed the X direction guide shaft 102 and the Y direction guide shaft 105, and a control unit 108 is provided to the bottom of this stand 107.

This apparatus further comprises a cleaning mechanism 109 for cleaning (restoring) the plurality of droplet discharge heads 20 of the head unit 101, and a heater 111 for evaporating off the solvent by heating the discharged liquid. A Y direction drive motor 110 is also provided to the cleaning mechanism 109.

The head unit 101 comprises a plurality of droplet discharge heads 20 (see FIG. 2) for discharging liquid from a plurality of nozzles 22 and coating the workpiece W. The system is designed so that the liquid can be discharged individually from the droplet discharge heads 20 according to the discharge voltage supplied from the control unit 108. These droplet discharge heads 20 will be discussed below.

The X direction drive motor 103 is, for example, a stepping motor, although it is not limited to this, and when a drive pulse signal is supplied in the X axis direction from the control unit 108, this motor rotates the X direction guide shaft 102 and moves the head unit 101 that is engaged with the X direction guide shaft 102 in the X direction.

Similarly, the Y direction drive motors 106 and 110 are each a stepping motor, for example, although not limited to this, and when a drive pulse signal is supplied in the Y axis direction from the control unit 108, these motors engage with and rotate the Y direction guide shaft 105 and move the cleaning mechanism 109 and the stage 104 equipped with the Y direction drive motors 106 and Y direction drive motor 110 in the Y axis direction.

When the droplet discharge heads 20 are to be cleaned, the cleaning mechanism 109 moves to a position facing the head unit 101, and performs capping, in which the mechanism is pressed snugly against the nozzle face of the droplet discharge heads 20 and draws out any unnecessary liquid by suction, wiping, in which nozzle faces to which liquid or the like has adhered are wiped, pre-discharge, in which some liquid is discharged from all of the nozzles of the droplet discharge heads 20, or a treatment in which any unnecessary liquid is received and discharged. The cleaning mechanism 109 will not be described in detail here.

The heater 111 is configured to heat-treat the workpiece W by lamp annealing, for example, although not limited to this, and performs heat treatment for evaporating and drying the liquid discharged onto the workpiece W and converting this liquid into a film. The power supply of this heater 111 is switched on and off by the control unit 108.

Coating with the droplet discharge apparatus 100 is performed as follows. A specific drive pulse signal is sent from the control unit 108 to the X direction drive motor 103 and the Y direction drive motor 106, to relatively move the head unit 101 in the sub-scanning direction (X direction), and the stage 104 in the main scanning direction (Y direction). Discharge voltage is supplied from the control unit 108 during this relative movement, and liquid is discharged as droplets from the droplet discharge heads 20 into a specific region of the workpiece W, thereby coating this region.

The amount in which the droplets are discharged from the droplet discharge heads 20 can be adjusted by the size of the discharge voltage supplied from the control unit 108.

Figure 2A:
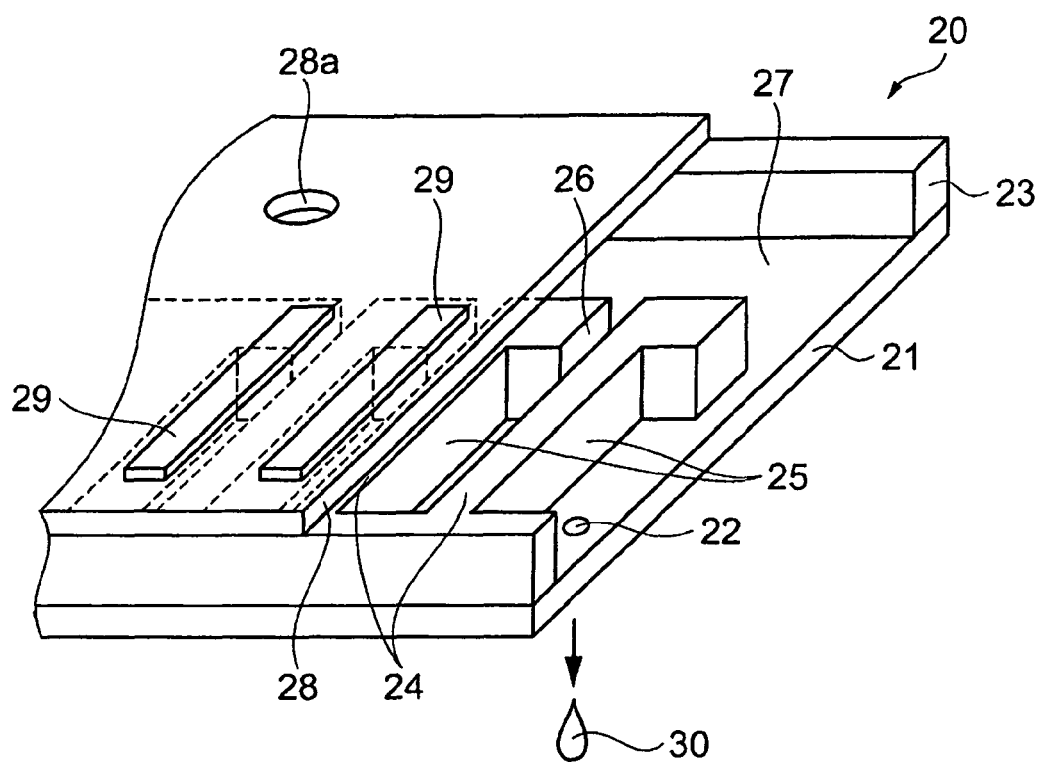
FIG. 2A is a simplified perspective view of the structure of the droplet discharge head.
Figure 2B:
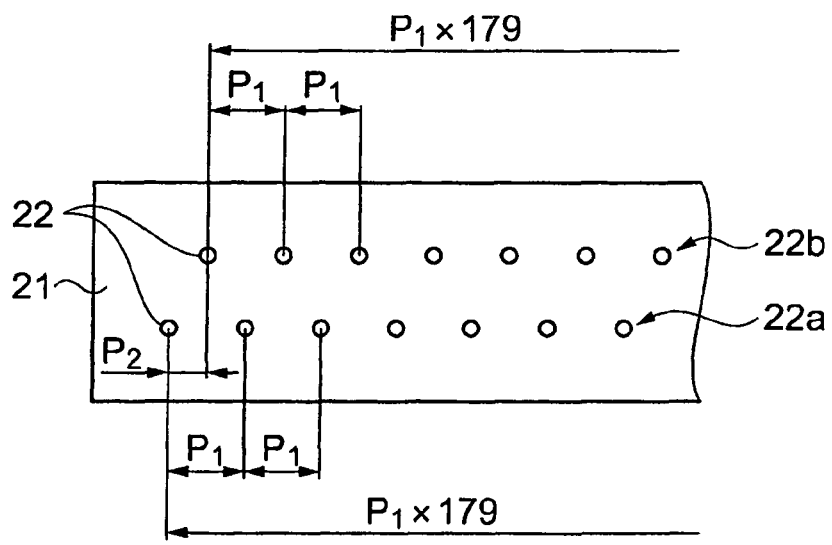
FIG. 2B is a simplified plan view showing the arrangement of a plurality of nozzles on the droplet discharge head.

FIG. 2 is a simplified diagram of the structure of a droplet discharge head. FIG. 2a is a simplified perspective view of the structure of the droplet discharge head, while FIG. 2b is a simplified plan view showing the arrangement of a plurality of nozzles on the droplet discharge head. The structure is enlarged or reduced in these drawings as needed for the sake of clarity.

As shown in FIG. 2a, the droplet discharge heads 20 are what is known as a piezoelectric type of inkjet head with a three-layer structure consisting of a nozzle plate 21 having a plurality of nozzles 22, a reservoir plate 23 in which is formed a liquid channel and which includes a partition component 24 that divides this up according to the nozzles 22, and a diaphragm 28 having piezoelectric elements 29 (as energy generation units). The nozzle plate 21, the partition component 24 of the reservoir plate 23, and the diaphragm 28 constitute a plurality of pressure generation chambers 25. The nozzles 22 communicate with the respective pressure generation chambers 25. A plurality of the piezoelectric elements 29 are disposed corresponding to the pressure generation chambers 25.

The reservoir plate 23 is provided with a common channel 27 in which liquid supplied from a tank (not shown) through a supply hole 28a formed in the diaphragm 28 is temporarily stored. The liquid that fills the common channel 27 is supplied through supply openings 26 into the pressure generation chambers 25.

As shown in FIG. 2b, the droplet discharge head 20 has two nozzle rows 22a and 22b, and a plurality (180) of the nozzles 22 with a diameter of about 28 μm are arranged in each row at a pitch P1. The two nozzle rows 22a and 22b are arranged on the nozzle plate 21 in a pattern staggered at a nozzle pitch P2 that is one-half the pitch P1. In this case, the pitch P1 is about 140 μm. Thus, when viewed from a direction perpendicular to the nozzle rows 22a and 22b, the 360 nozzles 22 are arranged at a nozzle pitch P2 of about 70 μm. In the actual discharge of the liquid, the 10 nozzles 22 at both ends of the nozzle rows 22a and 22b are not used. This takes into account that the amount of discharge from the nozzles 22 located at both ends tends to be less consistent than that of the other nozzles 22. Therefore, the total effective nozzle length of the droplet discharge head 20 having the two nozzle rows 22a and 22b is the nozzle pitch P2×319 (about 22 mm). The spacing between the nozzle rows 22a and 22b is about 2.54 mm.

When a drive waveform is applied as an electrical signal to the piezoelectric elements 29 of the droplet discharge head 20, the piezoelectric elements 29 themselves distort, which deforms the diaphragm 28. As a result, there is a change in the volume of the pressure generation chambers 25, which creates a pumping action that exerts pressure on the liquid filling the pressure generation chambers 25, allowing the liquid to be discharged as droplets 30 from the nozzles 22. The droplet discharge heads 20 in this embodiment have two nozzle rows 22a and 22b, but the present invention is not limited to this, and there may be just one row. Also, the term "nozzle row" discussed below indicates the effective row of nozzles. Furthermore, the energy generation units for discharging liquid as the droplets 30 from the nozzles 22 are not limited to being the piezoelectric elements 29, and may instead be a heater (as a heating element), an electrostatic actuator (as an electromechanical conversion element), or the like.

Figure 3:
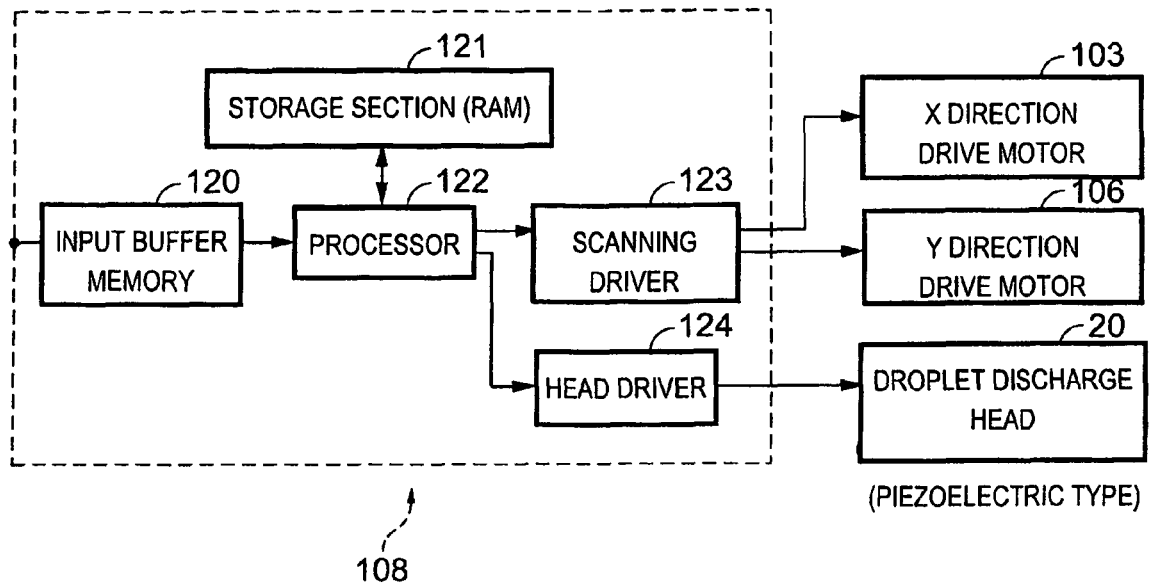
FIG. 3 is a block diagram illustrating the electrical structure of the control unit and the various components related to the control unit.

FIG. 3 is a block diagram illustrating the electrical structure of the control unit and the various components related to the control unit. As shown in FIG. 3, the control unit 108 comprises an input buffer memory 120 that accepts liquid discharge data from an external information processing device, and a processor 122 that expands discharge data temporarily stored in the input buffer memory 120 into a storage section (RAM) 121 and sends control signals to the various related components. This unit further comprises a scanning driver 123 that receives control signals from the processor 122 and sends position control signals to the X direction drive motor 103 and the Y direction drive motor 106, and a head driver 124 (as a head driving section) that similarly receives control signals from the processor 122 and sends drive voltage pulses (drive waveforms) to the droplet discharge heads 20.

The discharge data inputted to the input buffer memory 120 includes data expressing the relative position of the film formation regions on the workpiece W, data expressing the density at which the liquid droplets have landed in the film formation regions, and data indicating which of the nozzles 22 are being driven (on or off) out of the nozzle rows 22$a$ and 22$b$ of the droplet discharge heads 20.

The processor 122 sends to the scanning driver 123 any control signals related to the film formation regions out of the discharge data stored in the storage section 121. The scanning driver 123 receives these control signals, sends position control signals to the X direction drive motor 103, and moves the droplet discharge heads 20 in the X axis direction, which is the sub-scanning direction. It also sends position control signals to the Y direction drive motor 106 and moves the stage 104, which is supporting the workpiece W, in the Y axis direction, which is the main scanning direction. As a result, it moves the droplet discharge heads 20 and the workpiece W relatively, so that liquid droplets 30 are discharged from the droplet discharge heads 20 to the desired locations on the workpiece W.

The processor 122 takes data indicating the density at which the liquid droplets have landed in the film formation regions, out of the discharge data stored in the storage section 121, converts this data into four-bit discharge bitmap data for each of the nozzles 22, and sends the results to the head driver 124. It also sends to the head driver 124 channel signals (CH) and latch signals (LAT) that are "timing detection signals" indicating when the drive voltage pulses applied to the piezoelectric elements 29 of the droplet discharge heads 20 were emitted, on the basis of data indicating which of the nozzles 22 are being driven (on or off) out of the nozzle rows 22$a$ and 22$b$ of the droplet discharge heads 20. The head driver 124 receives these control signals, and sends the proper drive voltage pulses to the droplet discharge heads 20, which causes the liquid droplets 30 to be discharged from the nozzles 22.

In this embodiment, the processor 122 sends LAT signals and CH signals to the head driver 124 so that no liquid will be simultaneously discharged from adjacent nozzles 22 positioned over the film formation regions. Also, the head driver 124 can generate drive voltage pulses at a specific period corresponding to the LAT signals. The processor 122 sends CH signals to the head driver 124 so that drive waveforms that differ in time series will be applied to the piezoelectric elements 29 corresponding to the nozzles 22 being used, in synchronization with the relative movement of the workpiece W and the droplet discharge heads 20.

Color Filter

Figure 4:
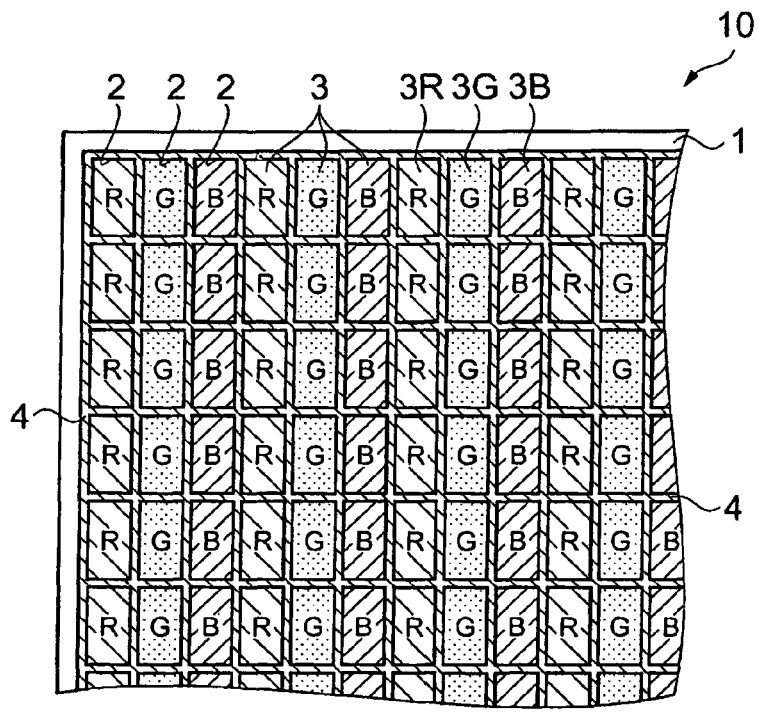
FIG. 4 is a plan view of a color filter.

Next, a color filter will be described through reference to FIG. 4. FIG. 4 is a plan view of a color filter.

As shown in FIG. 4, a color filter 10 has a partition component 4 that divides up the surface of a glass substrate 1 (as a transparent substrate) into a plurality of film formation regions 2. Color elements 3 of three colors (red (R), green (G), and blue (B)) are formed in the film formation regions 2. The color elements 3R, 3G, and 3B are disposed such that color elements 3 of the same color are in a straight line. That is, the color filter 10 comprises striped color elements 3.

Color Filter Manufacturing Method

Figure 5:
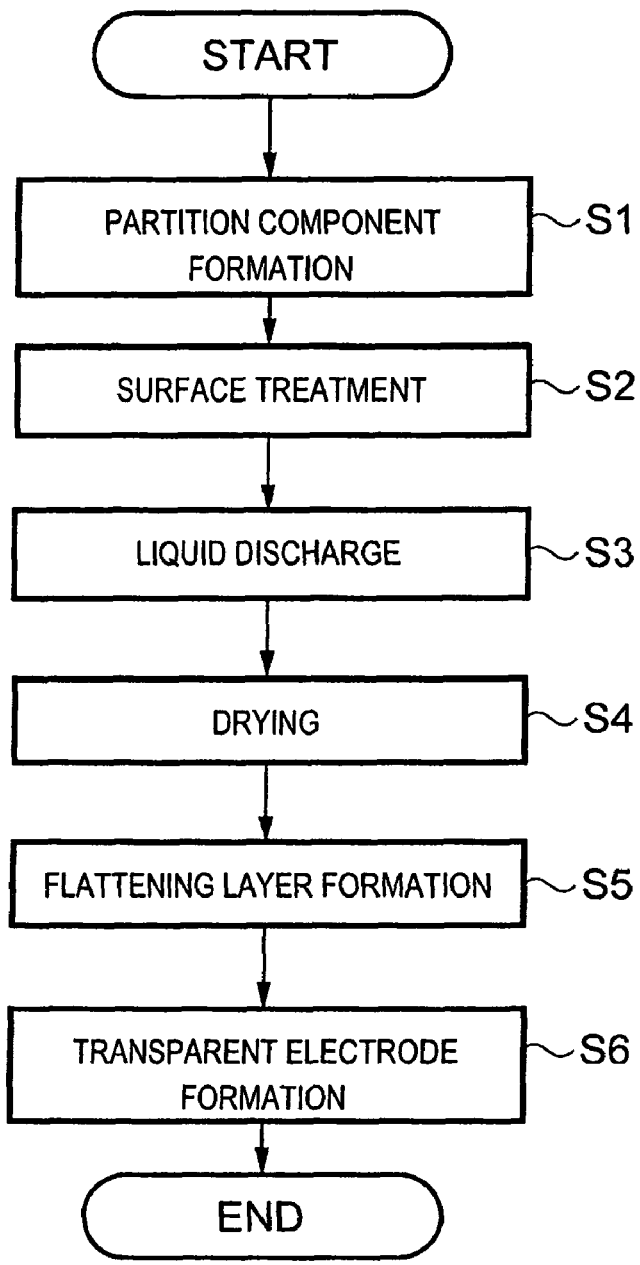
FIG. 5 is a flowchart illustrating a method for manufacturing a color filter.
Figure 6:
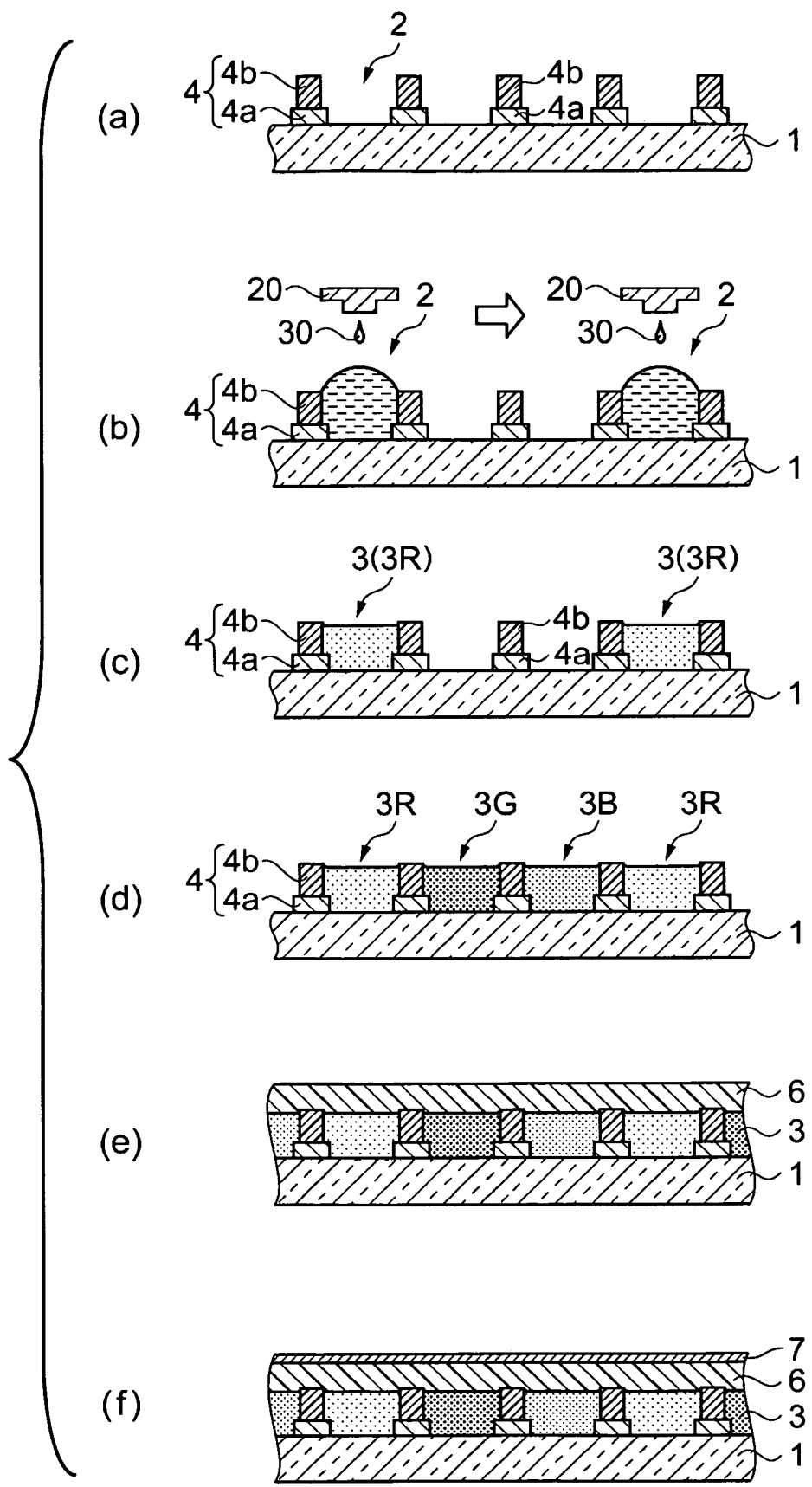
FIG. 6 is a series of diagrams (a) to (f) showing simplified cross sectional views illustrating a method for manufacturing a color filter.

Next, the method of the present invention for manufacturing a color filter will be described through reference to FIGS. 5 and 6. FIG. 5 is a flowchart illustrating a method for manufacturing a color filter, and FIGS. 6$a$ to 6$f$ are simplified cross sections illustrating a method for manufacturing a color filter. The method for manufacturing the color filter 10 of this embodiment makes use of the droplet discharge apparatus 100 described above, and also makes use of the liquid discharge method discussed below.

As shown in FIG. 5, the method for manufacturing the color filter 10 in this embodiment comprises a step of forming the partition component 4 on the glass substrate 1 (step S1), and a step of treating the surface of the glass substrate 1 on which the partition component 4 has been formed (step S2). This method further comprises a step of discharging a plurality of types of liquid containing different color element formation materials (as functional materials) onto the surface-treated glass substrate 1 (step S3), and a step of drying the discharged liquid to solidify the color elements 3 (step S4). The method further comprises a step of forming a flattening layer so as to cover the color elements 3 and the partition component 4 formed above (step S5), and a step of forming a transparent electrode over the flattening layer (step S6).

Step S1 in FIG. 5 is a step of forming the partition component 4. In step S1, as shown in FIG. 6$a$, a first partition component 4$a$ is formed on the surface of the glass substrate 1 so as to divide up the surface into the film formation regions 2. This is accomplished by a film formation method in which vacuum vapor deposition or sputtering is performed to form a metal film of chromium, aluminum, or the like, or a metal compound film that is opaque and covers the surface of the glass substrate 1. This product is then coated with a photosensitive resin, and exposure, developing, and etching are performed by photolithography so as to open up the film formation regions 2. This product is further coated with a photosensitive partition component formation material in a thickness of about 2 μm, and again exposure, developing, and etching are performed by photolithography to form a second partition component 4$b$ over the first partition component 4$a$. The partition component 4 has what is known as a two-layer bank structure composed of the first partition component 4$a$ and the second partition component 4$b$. The partition component 4 is not limited to this, however, and may instead have a single-layer structure of just the second partition component 4$b$ formed using an opaque, photosensitive partition component formation material. The flow then proceeds to step S2.

Step S2 in FIG. 5 is a surface treatment step. In step S2, the surface of the glass substrate 1 is treated so as to be lyophilic so that the liquid discharged in the subsequent liquid discharge step will land, wet, and spread out over the film formation regions 2. At least the top part of the second partition component 4$b$ is also treated so as to be liquid-repellent, so that if some of the discharged liquid should land on the second partition component 4$b$, it will move into the film formation regions 2.

The surface treatment method involves subjecting the glass substrate 1 on which the partition component 4 has been formed to a plasma treatment in which the treatment gas is $O_2$, and a plasma treatment in which the treatment gas is a fluorine-based gas. Specifically, the film formation regions 2 are subjected to a lyophilic treatment, after which the surface (including the wall faces) of the second partition component 4$b$ composed of a photosensitive resin are subjected to a liquid-repellent treatment. The latter treatment can be omitted if the material that forms the second partition component 4$b$ is liquid repellent itself. The flow then moves on to step S3.

Step S3 in FIG. 5 is a step of discharging the liquid. In step S3, as shown in FIG. 6$b$, the glass substrate 1 that has been surface treated and on which the partition component 4 has been formed is placed on the stage 104 of the droplet discharge apparatus 100. Then, the droplets 30 are discharged into the film formation regions 2 from the nozzles 22 of the droplet discharge heads 20 filled with the liquid containing the color element formation material, in synchronization with the relative movement (in the main scanning direction) of the droplet discharge heads 20 and the stage 104 on which the glass substrate 1 has been placed. A suitable control signal is sent from the processor 122 of the control unit 108 to the head driver 124, on the basis of discharge data such as the number of discharges, so that the total amount of liquid discharged into the film formation regions 2 will yield the desired film thickness in the subsequent drying step (step S4). The discharge method will be discussed in detail below. The flow then moves on to step S4.

Step S4 in FIG. 5 is a drying step. In step S4, as shown in FIG. 6c, the glass substrate 1 onto which the liquid has been discharged is heated by the heater 111 provided to the droplet discharge apparatus 100, the solvent component is evaporated from the liquid, and the color elements 3 composed of color element formation materials are solidified.

In this embodiment, first the color element 3R is formed by discharging the liquid containing the R (red) color element formation material into the film formation regions 2 and drying, and then the liquids containing the G (green) and B (blue) color element formation materials are discharged and dried in that order, which forms the three colors of color elements 3R, 3G, and 3B, as shown in FIG. 6d. The present invention is not limited to this, however, and may instead be such that, for example, a plurality of types of liquid containing different color element formation materials are putted into different droplet discharge heads 20 in the discharge step of step S3, the droplet discharge heads 20 are mounted in the head unit 101, and the liquids are discharged from the nozzles 22 into the desired film formation regions 2. Another method that may be used is to set the glass substrate 1 in a reduced pressure drying apparatus that allows drying with the evaporation pressure of the solvent held steady, and then dry under reduced pressure.

Liquid Discharge Method

The method for discharging the liquid into the film formation regions 2 will now be described in detail through working examples.

WORKING EXAMPLE 1

Figure 7A:
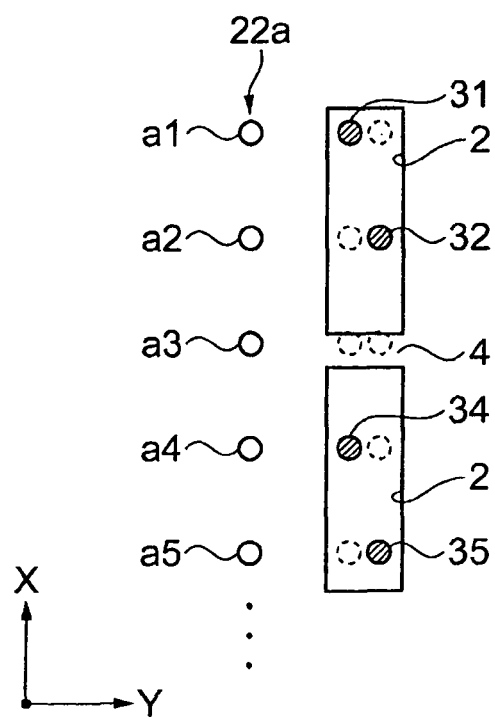
FIG. 7A is a simplified schematic plan view of the nozzles and the discharge medium used in the discharge method.
Figure 7B:
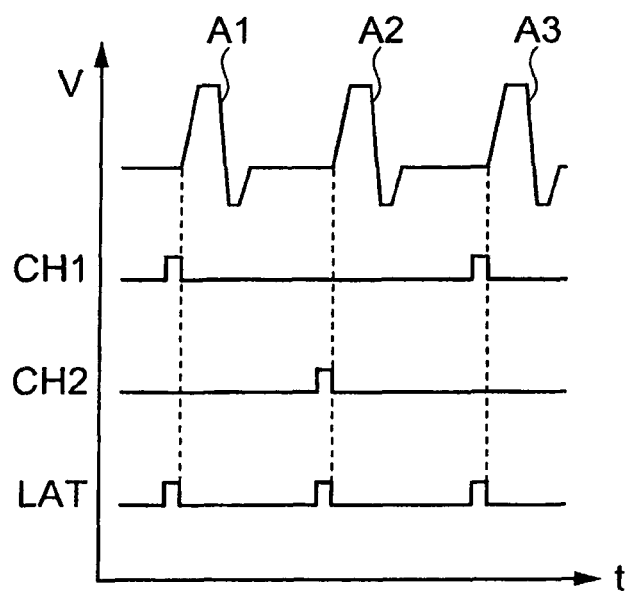
FIG. 7B is a chart of the relationship between the drive waveform and the control signal.

FIGS. 7A and 7B illustrate the method for discharging a liquid in Working Example 1. FIG. 7A is a plan view of the discharge method, and FIG. 7B is a chart of the relationship between the drive waveform and the control signal.

As shown in FIG. 7A, the discharge method of Working Example 1 is a kind of discharge method that is called lateral writing, in which the nozzle row 22a of the droplet discharge heads 20 moves relatively in the main scanning direction (Y direction) in a state of being substantially parallel to the long-side direction of the film formation regions 2. With respect to the film formation regions 2 arranged in the sub-scanning direction (X direction), of the nozzle row 22a, a nozzle a1 and a nozzle a2 are positioned over (overlap) the upper film formation regions 2, and a nozzle a4 and a nozzle a5 are positioned over (overlap) the lower film formation regions 2. The droplet discharge heads 20 are arranged in a state in which a nozzle a3 is positioned over to the partition component 4.

The discharge method of Working Example 1 comprises a first discharge step of performing discharge by selecting the nozzles a1 and a4 to be used so that the liquid is not discharged simultaneously from adjacent nozzles a1 and a2 and nozzles a4 and a5 that are positioned over the film formation regions 2, and a second discharge step of performing discharge by selecting a combination of nozzles a2 and a5 different from that in the first discharge step, so that the liquid is not discharged simultaneously from adjacent nozzles a1 and a2 and nozzles a4 and a5 that are positioned over the film formation regions. In the first discharge step and second discharge step, the nozzle a3 positioned over the partition component 4 is not used.

Therefore, as shown in FIG. 7A, in the first discharge step, a droplet 31 of liquid discharged from the nozzle a1 lands in an upper film formation region 2. A droplet 34 of liquid discharged from the nozzle a4 lands in a lower film formation region 2. No liquid is discharged on the partition component 4. The landed droplets 31 and 34 wet and spread out over the surface of the glass substrate 1 of the film formation regions 2 because this surface has undergone a lyophilic treatment. To form the color elements 3 in a specific film thickness, since the discharged amount is not yet sufficient in this case, the second discharge step is performed. In the second discharge step, a combination of nozzles a2 and a5 that is different from that in the first discharge step is selected so that liquid will not be discharged simultaneously from adjacent nozzles a1 and a2 and nozzles a4 and a5, and the discharged droplets 32 and 35 land in the film formation regions 2. Specifically, the nozzles a1 and a4 are nozzles constituting a first group in the nozzle row 22a, and the nozzles a2 and a5 are nozzles constituting a second group in the nozzle row 22a, and discharge (first discharge step/second discharge step) is performed at mutually different timing.

Naturally, in the other film formation regions 2 in which color elements 3 of the same color are formed in the X direction, discharge is similarly performed from the other nozzles of the nozzle row 22a in the first and second discharge steps. If further discharge is possible in synchronization with main scanning in the Y direction, nozzles a1 and a4 may be selected for discharge again. If even then the required discharge amount is not reached, then after main scanning has been performed one time, in which liquid is discharged to the film formation regions 2 where color elements 3 of the same color are formed, sub-scanning of the droplet discharge heads 20 is performed in the X direction, and then main scanning is performed again, and this cycle can be repeated until the specified amount of liquid has been uniformly discharged into the film formation regions 2 of the same color.

Next will be described the selection of the drive waveforms (drive voltage pulses) applied to the piezoelectric elements of the nozzles that are used. As shown in FIG. 7B, for example, the head driver 124 of the control unit 108 emits drive waveforms A1, A2, A3, . . . , An at a period of 20 kHz according to a LAT signal (pulse). These drive waveforms A1, A2, A3, . . . , An have the same shape and size, and are designed so that the specified amount of droplets will be discharged when these waveforms are supplied to the piezoelectric elements 29. A drive waveform A1, selected by a signal CH1 (a CH signal from the processor 122), is applied to the piezoelectric elements 29 corresponding to the nozzles a1 and a4 used in the first discharge step. A drive waveform A2, selected by a signal CH2 (a CH signal from the processor 122), is applied to the piezoelectric elements 29 corresponding to the nozzles a2 and a5 used in the second discharge step. When the first discharge step and second discharge step are performed repeatedly, once again drive waveforms that are different in time series are selected by LAT signals and CH signals, and droplets are discharged, such that liquid will not be discharged simultaneously from adjacent nozzles that are positioned over the film formation regions 2.

The discharge conditions of the droplet discharge apparatus 100 in this embodiment are set as follows. The relative speed of main scanning in the Y direction, at which the liquid is discharged in synchronization with the relative movement of the stage 104 and the droplet discharge heads 20, is set to about 200 mm/second. Therefore, if the period of the drive waveforms A1, A2, A3, . . . , An generated by the LAT signals is 20 kHz, then the time required for one period will be 0.05 μsec. Thus, the amount of relative movement of the droplet discharge heads 20 during this time is 10 μm. Consequently, the spacing between the landed droplets 31 and 34 and the droplets 32 and 35 in the main scanning direction is 10 μm. In actual practice, the size of the film formation regions 2 into which the liquid is discharged varies considerably. Thus, the number of discharges in the main scanning direction should be determined after taking into account the spacing of the landed droplets resulting from main scanning.

Furthermore, even though the partition component 4 has undergone a liquid repellent treatment so that the liquid will move into the film formation regions 2 if it liquid should land on the partition component 4, the spacing in the X direction of the film formation regions 2 will not necessarily be an integer multiple of the pitch P1 of the nozzles 22, and the location of the nozzles 22 positioned over the partition component 4 will not be constant. Thus, when liquid discharged from the nozzles 22 hits the partition component 4, it is not certain into which of the two film formation regions 2 flanking the partition component 4 the liquid will move. To discharge the specified amount of liquid accurately into the film formation regions 2, the liquid is preferably discharged so as not to hit the partition component 4.

The amount (volume or weight) of the droplets 30 discharged from the nozzles 22 of the droplet discharge heads 20 can be varied by varying the size (potential) of the drive waveforms (drive voltage pulses) applied to the corresponding piezoelectric elements 29. Therefore, if the nozzles 22 are in a state of not overlapping to the partition component 4, depending on the drive waveforms, the droplets 30 discharged from these nozzles may still overlaps with the partition component 4. Conversely, even if the nozzles 22 are in a state of partially overlapping to the partition component 4, depending on the drive waveforms, the droplets 30 discharged from these nozzles may not overlap with the partition component 4. Consequently, in this embodiment, if the liquid discharged from the selected nozzles 22 will touch the partition component 4, or more specifically, when the diameter of the droplets 30 prior to landing, and assuming them to be roughly spherical, reaches or touches the partition component 4, discharge data is produced so that these nozzles will not be used. As a result, the specified amount of liquid can be consistently discharged to the film formation regions 2.

In Working Example 1 above, as shown in FIG. 7A, the nozzles a1 and a4 were selected in the first discharge step, but the nozzles a2 and a5 may be selected first instead. It is also possible to select the nozzles a2 and a4 at the time of subsequent discharge, after the nozzles a1 and a5 have been selected first in the first discharge step. The result of this is that the droplets will be made to land, wet, and spread out near the partition component 4 first, in the long-side direction of the film formation regions 2, and can later be made to land near the center portion. Thus, the droplets are made to land, wet, and spread over the corner areas of the film formation regions 2 first, which are more difficult for the droplets to wet, and the liquid can be imparted more uniformly.

WORKING EXAMPLE 2

Figure 8A:
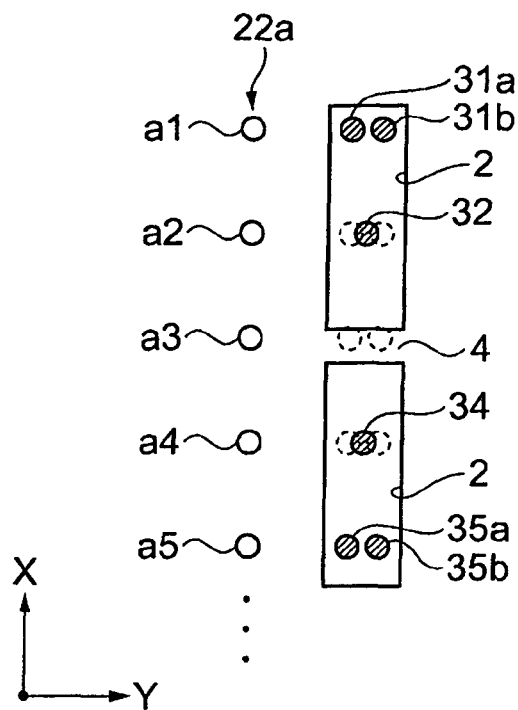
FIG. 8A is a simplified schematic plan view of the nozzles and the discharge medium used in the discharge method.
Figure 8B:
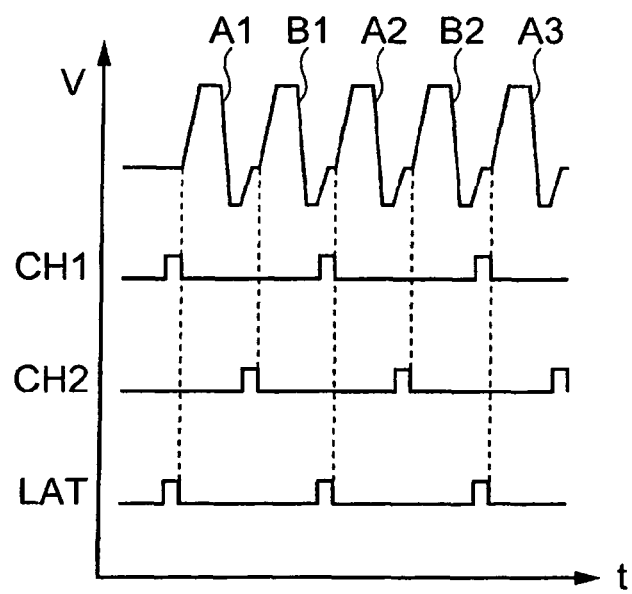
FIG. 8B is a chart of the relationship between the drive waveform and the control signal.

FIGS. 8A and 8B illustrate the method for discharging a liquid in Working Example 2. FIG. 8A is a plan view of the discharge method, and FIG. 8B is a chart of the relationship between the drive waveform and the control signal. The liquid discharge method of Working Example 2 differs from the method in Working Example 1 in that a plurality of (two) drive waveforms are emitted by the head driver 124 in one period, and these are selectively applied to the piezoelectric elements 29 corresponding to the nozzles to be used.

As shown in FIG. 8A, the discharge method of Working Example 2 comprises a first discharge step of performing discharge by selecting the nozzles a1 and a5 to be used so that the liquid is not discharged simultaneously from adjacent nozzles a1 and a2 and nozzles a4 and a5 positioned over to the film formation regions 2, and a second discharge step of performing discharge by selecting a combination of nozzles a2 and a4 different from that in the first discharge step, so that the liquid is not discharged simultaneously from adjacent nozzles a1 and a2 and nozzles a4 and a5 positioned over the film formation regions. Just as in Working Example 1, in the first discharge step and second discharge step, the nozzle a3 positioned over the partition component 4 is not used.

More specifically, as shown in FIG. 8B, the head driver 124 emits two drive waveforms (such as drive waveform A1 and drive waveform B1) in one period on the basis of a LAT signal. The period of the LAT signal is 20 kHz, just as in Working Example 1. For instance, in the first discharge step, the drive waveform A1 selected by the signal CH1 (CH signal) is applied to the piezoelectric elements 29 corresponding to the nozzles a1 and a5 being used, and this causes droplets 31a and 35a to land in the film formation regions 2. In the second discharge step, a drive waveform B1 selected by the signal CH2 (CH signal) is applied to the piezoelectric elements 29 corresponding to the nozzles a2 and a4 being used, and this causes droplets 32 and 34 to land in the film formation regions 2. The first discharge step is then repeated to apply a drive waveform A2 selected by a signal CH1 (CH signal) to the piezoelectric elements 29 corresponding to the nozzles a1 and a5 being used, and this causes droplets 31b and 35b to land in the film formation regions 2. No liquid is discharged simultaneously from the adjacent nozzles a1 and a2 or nozzles a4 and a5 that are positioned over the film formation regions 2 during any of these discharges.

In this case, the spacing between the droplets 31a and 35 and the droplets 32 and 34 that land in each discharge, and the spacing between the droplets 32 and 34 and the droplets 31b and 35b, is 5 μm, or one-half that in Working Example 1. Therefore, with the discharge method of Working Example 2, more of the droplets can be made to land in the film formation regions 2 than with the discharge method of Working Example 1 at the same main scanning rate. Specifically, it is possible to reduce the time it takes to discharge a specific amount of liquid to the film formation regions 2. The combinations of nozzles used are not limited to those given above, and in the first discharge step and second discharge step, there may be occasions when some nozzles are used more than once.

Incidentally, in Working Example 1, it is possible to obtain the same effect as in Working Example 2 by doubling the period at which the drive waveforms are emitted to 40 kHz, but depending on the specific frequency characteristics of the droplet discharge heads 20, if the period (drive frequency) of the drive waveforms is raised, the piezoelectric elements 29 to which the drive waveforms are applied may not be able to keep up, so that the droplets may not be discharged in the specified amount. Working Example 2 takes this problem into account and focuses on how the control signals are emitted by the processor 122 of the control unit 108.

If the discharge method of the above Working Example 1 or 2 is used, it is possible to form uniform color elements 3 by discharging liquid containing color element formation materials, in a consistent amount, to the film formation regions 2.

The subsequent steps in the manufacture of the color filter 10 will now be described. Step S5 in FIG. 5 is a step of forming a flattening layer. In step S5, as shown in FIG. 6e, a flattening layer 6 is formed so as to cover the partition component 4 and the color elements 3R, 3G, and 3B. An example of the formation method is one in which a coating of an acrylic resin is applied by spin coating, roll coating, or the like and then dried. Another method that can be employed is to coat with a photosensitive acrylic resin, then cure by irradiating with UV light. The film thickness is about 100 nm. The flow then moves on to step S6.

Step S6 in FIG. 5 is a step of forming a transparent electrode. In step S6, as shown in FIG. 6f, a transparent electrode 7 composed of ITO (Indium Tin Oxide) or the like is formed over the flattening layer 6. An example of the film formation method is to use a conductive material such as ITO as the target and perform sputtering or vapor deposition in a vacuum. In this case the film thickness is about 10 nm. The transparent electrode 7 thus formed is suitably worked into the required shape (pattern) with an electro-optical apparatus in which the color filter 10 is used.

With the above method for manufacturing the color filter 10, the color filter 10 having a plurality of types of color elements 3R, 3G, and 3B with reduced color unevenness caused by discharge can be manufactured by discharging a plurality of types of liquid containing different color element formation materials in a consistent amount into the film formation regions 2.

Electro-Optical Apparatus

Figure 9:
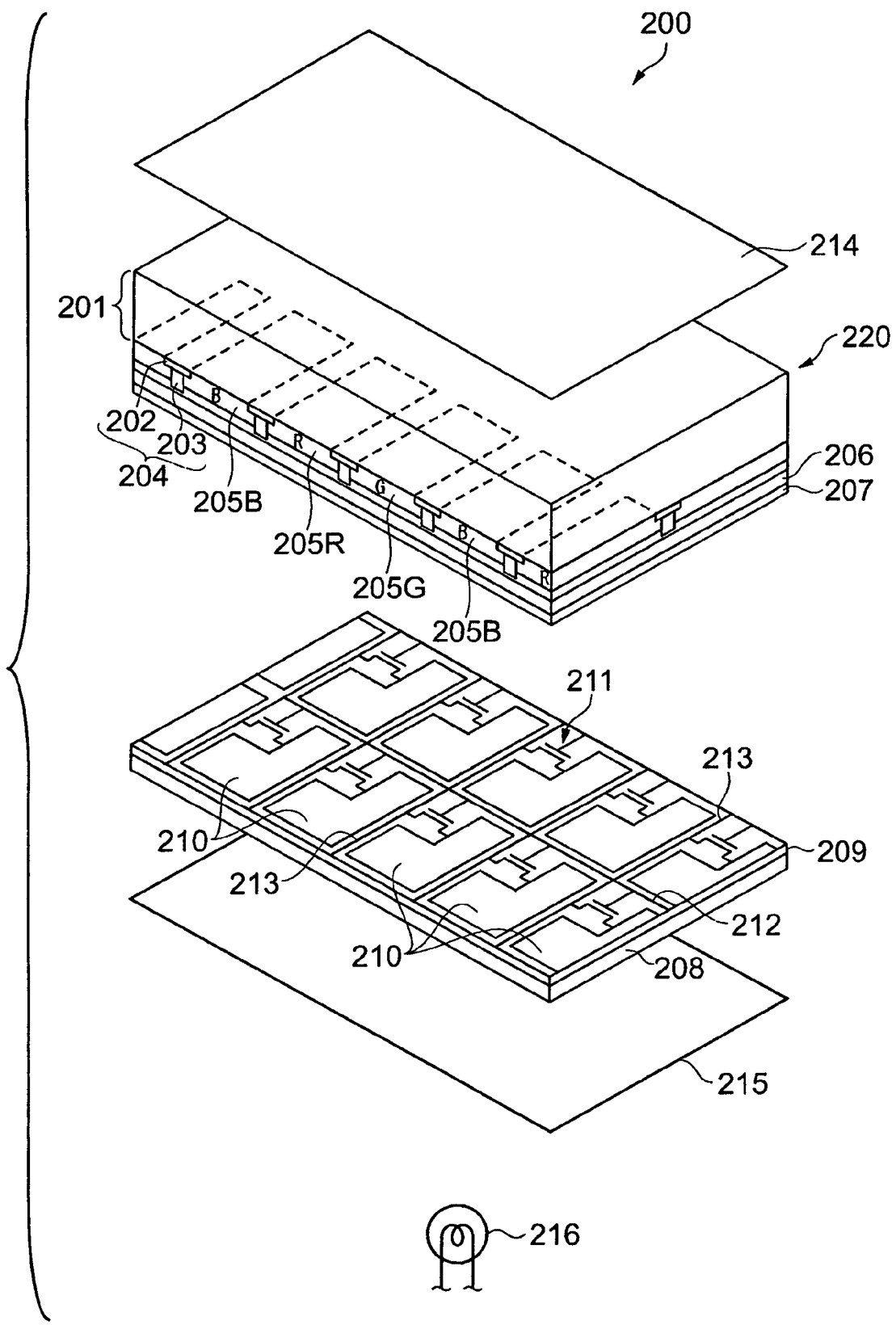
FIG. 9 is a simplified and partially exploded perspective view of a liquid crystal display device.

Next, a liquid crystal display device will be described, through reference to FIG. 9, as an electro-optical apparatus in this embodiment. FIG. 9 is a simplified and partially exploded perspective view of the liquid crystal display device.

As shown in FIG. 9, a liquid crystal display device 200 in this embodiment comprises a TFT (Thin Film Transistor) transmission type of liquid crystal display panel 220, and an illumination apparatus 216 for illuminating the liquid crystal display panel 220. The liquid crystal display panel 220 comprises a counter substrate 201 having a color filter as a color element, an element substrate 208 having TFT elements 211, one whose three terminals is connected to a pixel electrode 210, and liquid crystals (not shown) sandwiched between the substrates 201 and 208. An upper polarizing plate 214 and a lower polarizing plate 215 that polarize the transmitted light are disposed on the surfaces of the pair of substrates 201 and 208 that are the outer faces of the liquid crystal display panel 220.

The counter substrate 201 is composed of a transparent material such as glass. RGB (three-color) color filters 205R, 205G, and 205B are formed as a plurality of types of color element in a plurality of film formation regions created by dividing the side on which the liquid crystals are sandwiched, into a matrix with a partition component 204. The partition component 204 is made up of a lower layer bank 202, called a black matrix, which is composed of chromium or another opaque metal or an oxide film thereof, and an upper layer bank 203 composed of an organic compound formed over (facing downward in the drawing) the lower layer bank 202. The counter substrate 201 also comprises an overcoat layer (OC layer) as a flattening layer that covers the partition component 204 and the color filters 205R, 205G, and 205B that are divided up by the partition component 204, and a counter electrode 207 composed of a transparent conductive film such as ITO (Indium Tin Oxide) formed so as to cover the OC layer 206. The counter substrate 201 is manufactured by the method for manufacturing the color filter 10 described in the above embodiment.

The element substrate 208 is similarly composed of a transparent material such as glass, and has the pixel electrode 210, which is formed in a matrix via an insulating film 209 on the side on which the liquid crystals are sandwiched, and the plurality of TFT elements 211 formed corresponding to the pixel electrode 210. Of the three terminals of the TFT elements 211, the other two terminals that are not connected to the pixel electrode 210 are connected to a scanning line 213 and a data line 212 that are laid out in a lattice surrounding the pixel electrode 210 in a state of being insulated from one another.

The illumination apparatus 216 may be any kind, as long as it is equipped with a light guide plate, diffuser plate, reflector plate, or other such structure that makes use of a white LED, EL, cold cathode tube, or the like as its light source, for example, and allows the light from the light source to be emitted toward the liquid crystal display panel 220.

The liquid crystal display device 200 in this embodiment is equipped with the counter substrate 201 having color filters 205R, 205G, and 205B and manufactured with the method for manufacturing the color filter 10 in the embodiment discussed above, and therefore affords high display quality with little color unevenness or other such display problems.

The liquid crystal display panel 220 is not limited to having the TFT elements 211 as its active elements, and may instead have TFD (Thin Film Diode) elements, and furthermore may be a passive type of liquid crystal display device in which the electrodes constituting pixels are disposed so as to intersect each other, as long as at least one of the substrates is equipped with a color filter. Also, the upper and lower polarizing plates 214 and 215 may be combined with an optically functional film such as a phase difference film, which is used for such purposes as improving the viewing angle dependency.

Electronic Device

Figure 10:
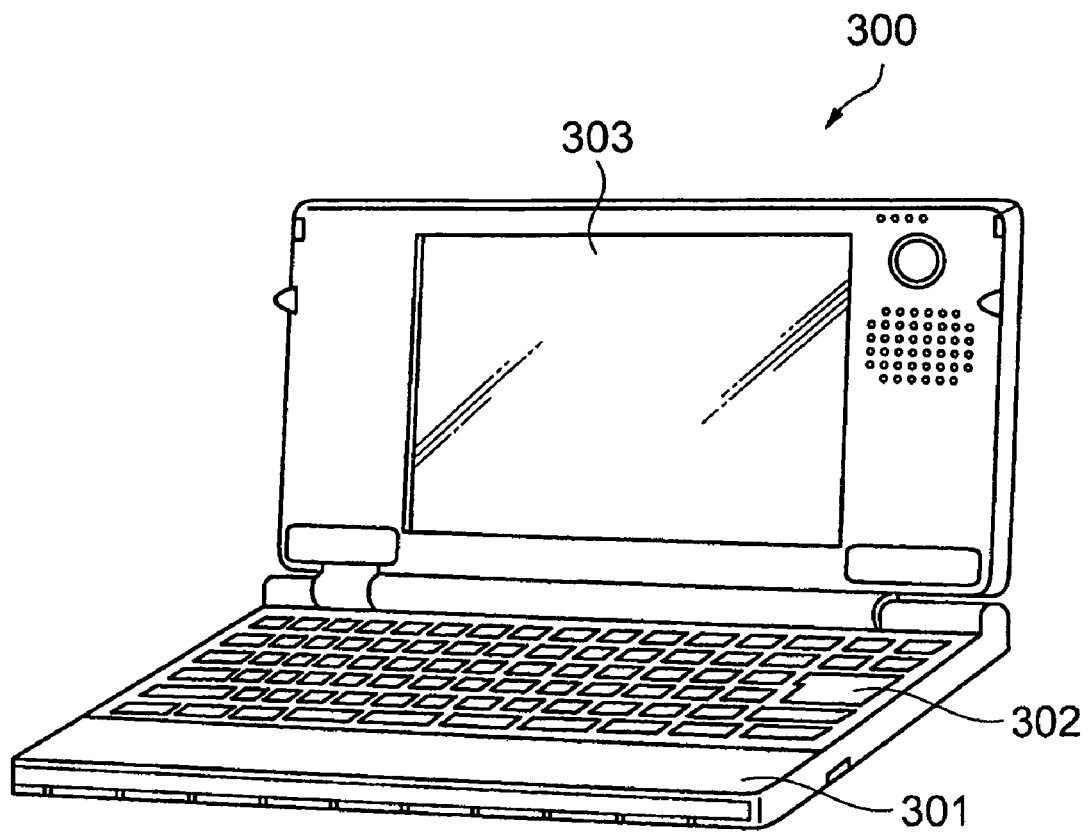
FIG. 10 is a perspective view of a portable information processing device.

Next, a portable information processing device will be described as the electronic device of this embodiment, through reference to FIG. 10. FIG. 10 is a perspective view of a portable information processing device.

As shown in FIG. 10, a portable information processing device 300 of this embodiment comprises an information processing device main unit 301 having an input keyboard, and a display component 303. The liquid crystal display device 200, which has high display quality with little color unevenness and so forth, is installed in the display component 303.

The effects of the above embodiment are as follows.

(1) In the liquid discharge method of Working Example 1 in the above embodiment, in the first discharge step, a liquid containing a functional material is discharged to the film formation regions 2 of the glass substrate 1 by selecting the nozzles a1 and a4 to be used from among a nozzle row 22a, so that the liquid is not discharged simultaneously from the adjacent nozzles a1 and a2 and nozzles a4 and a5 that are positioned over the film formation regions 2. Then, in the second discharge step, discharge is performed by selecting the nozzles a2 and a5, which is a different combination from that in the first discharge step, so that the liquid is not discharged simultaneously from the adjacent nozzles a1 and a2 and nozzles a4 and a5 that are positioned over the film formation regions 2. Therefore, liquid is never discharged simultaneously from the adjacent nozzles a1 and a2 and nozzles a4 and a5 that are positioned over the film formation regions 2 in any single discharge. Also, the nozzles from which the liquid is discharged are different in the former and latter discharges. Drive waveforms that differ in time series from out of the drive waveforms emitted at a period of 20 kHz by the head driver 124 are selected for each discharge and are applied to the piezoelectric elements 29 corresponding to the nozzles to be used. Further, the system is controlled so that liquid is not discharged to the partition component 4 that divides up the surface into film formation regions 2. Thus, compared to when the liquid is discharged simultaneously from the adjacent nozzles a1 and a2 and nozzles a4 and a5, electrical or mechanical crosstalk is less likely to occur in the droplet discharge heads 20, so variance in the discharge amount can be reduced between adjacent nozzles. Specifically, when this discharge method is used, the liquid is discharged in a consistent amount, and uniform color elements 3 composed of color element formation materials can be formed in the film formation regions 2.

(2) The liquid discharge method of Working Example 2 in the above embodiment differs from the discharge method of Working Example 1 in that the head driver 124 emits a plurality of (two) drive waveforms in a single period, and drive waveforms that differ in time series out of the plurality of drive waveforms are selected by CH signals in the former and latter discharges, and applied to the piezoelectric elements 29 corresponding to the nozzles to be used. Therefore, compared to the discharge method of Working Example 1, more of the droplets 30 can be landed in the film formation regions 2 at a given main scanning rate. Specifically, the time it takes to discharge a specific amount of liquid into the film formation regions 2 can be shortened.

(3) The method for manufacturing the color filter 10 in the above embodiment makes use of the liquid discharge method of the above-mentioned Working Example 1 or Working Example 2, so a plurality of types of liquid containing different color element formation materials can be discharged as the droplets 30 in a consistent amount into the film formation regions 2, and a color filter 10 having a plurality of types of color element (3R, 3G, and 3B) can be manufactured with reduced color unevenness or other such problems caused by discharge.

(4) The liquid crystal display device 200 described as an electro-optical apparatus in the above embodiment is equipped with the counter substrate 201 having the color filters 205R, 205G, and 205B manufactured using the method for manufacturing the color filter 10 in the above embodiment, so the liquid crystal display device 200 can be provided with high display quality and little color unevenness or other such problems.

(5) The portable information processing device 300 described as an electronic device in the above embodiment is such that the liquid crystal display device 200 having high display quality is installed in the display component 303, so it is possible to provide a portable information processing device 300 with which text, images, and other such information can be attractively displayed in color.

Modifications of the above embodiment are as follows.

Modification 1

The liquid discharge methods described in Working Examples 1 and 2 in the above embodiment had a structure in which a nozzle row 22a consisting of a plurality of nozzles was arranged in the long-side direction (X direction) of the film formation regions 2, and the nozzle row 22a and the workpiece W (the discharge medium) on which the film formation regions 2 were formed were relatively scanned in the short-side direction (Y direction) of the film formation regions 2, and the liquid was discharged, but the present invention is not limited to this. In FIG. 7A or 8a, the structure may instead be such that the nozzle row 22a is arranged either perpendicular or at an angle to the long-side direction (X direction) of the film formation regions 2, and the liquid is discharged while scanning in the long-side direction (X direction) of the film formation regions 2.

Modification 2

The liquid discharge method of the above embodiment is not limited to Working Examples 1 and 2. For instance, if there are many nozzles 22 positioned over the film formation regions 2 in the main scanning direction, a discharge method that combines Working Examples 1 and 2 can be employed. This allows the droplets to land at different spacings of 10 μm and 5 μm, so the droplet landing position in the film formation regions 2 can be adjusted by changing the nozzles used. Specifically, the landing position can be varied so that color unevenness is less likely to occur.

Modification 3

The liquid discharge method in the above embodiment is not limited to the discharge of a liquid to the same film formation regions 2 as was done in Working Examples 1 and 2. For instance, the film formation regions may be continuous or close together in the main scanning direction, and a liquid containing the same functional material may be discharged into said film formation regions. Therefore, film formation using the liquid discharge method of the above embodiment is not limited to a color filter, and the present invention can also be applied, for example, to a method for forming metal wiring or an oriented film, as long as a liquid containing a metal wiring material or a liquid containing an oriented film formation material is used.

Modification 4

Figure 11:
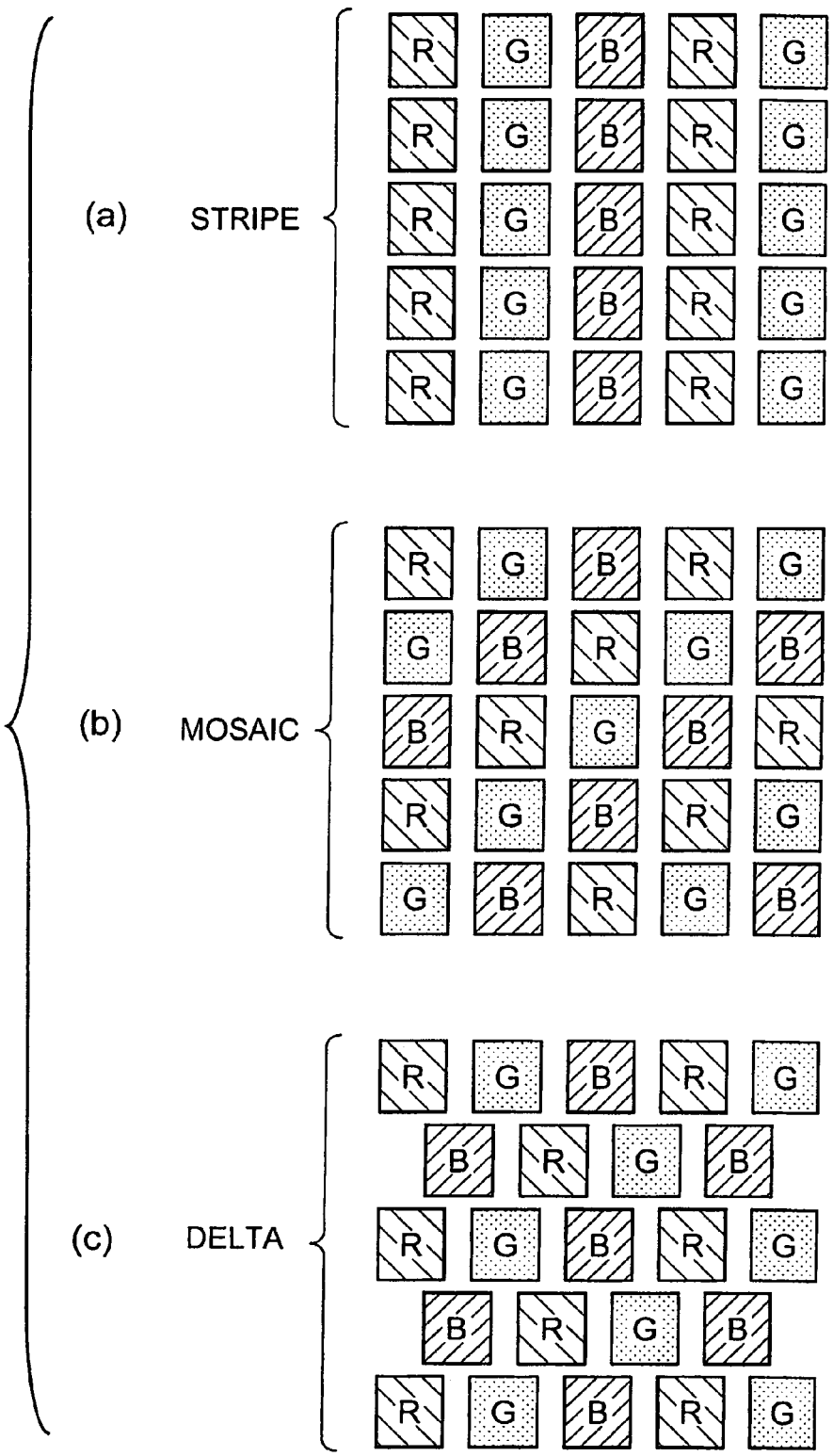
FIG. 11 is a set of diagrams (a) to (c) illustrating examples of the layout of color elements in a color filter.

The color filter 10 manufactured by the method for manufacturing the color filter 10 in the above embodiment is not limited to that structure. FIG. 11 is a plan view of the layout of color elements in a color filter. The color filter 10 in this embodiment, as shown in FIG. 11a, is what is known as a striped configuration, in which the different color elements 3R, 3G, and 3B are arranged in straight lines that are all in the same direction. For example, the method for manufacturing the color filter 10 of the above embodiment can also be applied to a mosaic arrangement (FIG. 11b) or a delta-shaped arrangement (FIG. 11c). Also, the different color elements 3 are not limited to three colors, and may instead consist of four or more colors.

Modification 5

The electro-optical apparatus that makes use of the color filter 10 manufactured by the method for manufacturing the color filter 10 of the above embodiment is not limited to the liquid crystal display device 200. One example is a transmission type of organic EL display device, in which the color filter 10 and a substrate equipped with a plurality of organic EL light-emitting elements corresponding to the color elements 3R, 3G, and 3B are sealed together to prevent water or the like from getting in.

Modification 6

The electronic device in which the liquid crystal display device 200 is installed is not limited to the portable information processing device 300. For instance, portable telephones, portable terminal devices and portable information devices known as PDAs (Personal Digital Assistants), desktop personal computers, digital still cameras, automotive monitors, digital video cameras, LCD television sets, video tape recorders with a viewfinder or with a direct-view monitor, car navigation systems, pagers, electronic notebooks, calculators, word processors, work stations, videophones, POS terminals, and the like can be used favorably as image display section, and an attractive display can be achieved with any electronic device.

Second Embodiment

Next, a second embodiment of the present invention will be described through reference to FIGS. 12 and 13, focusing on the differences from the first embodiment.

Figure 12:
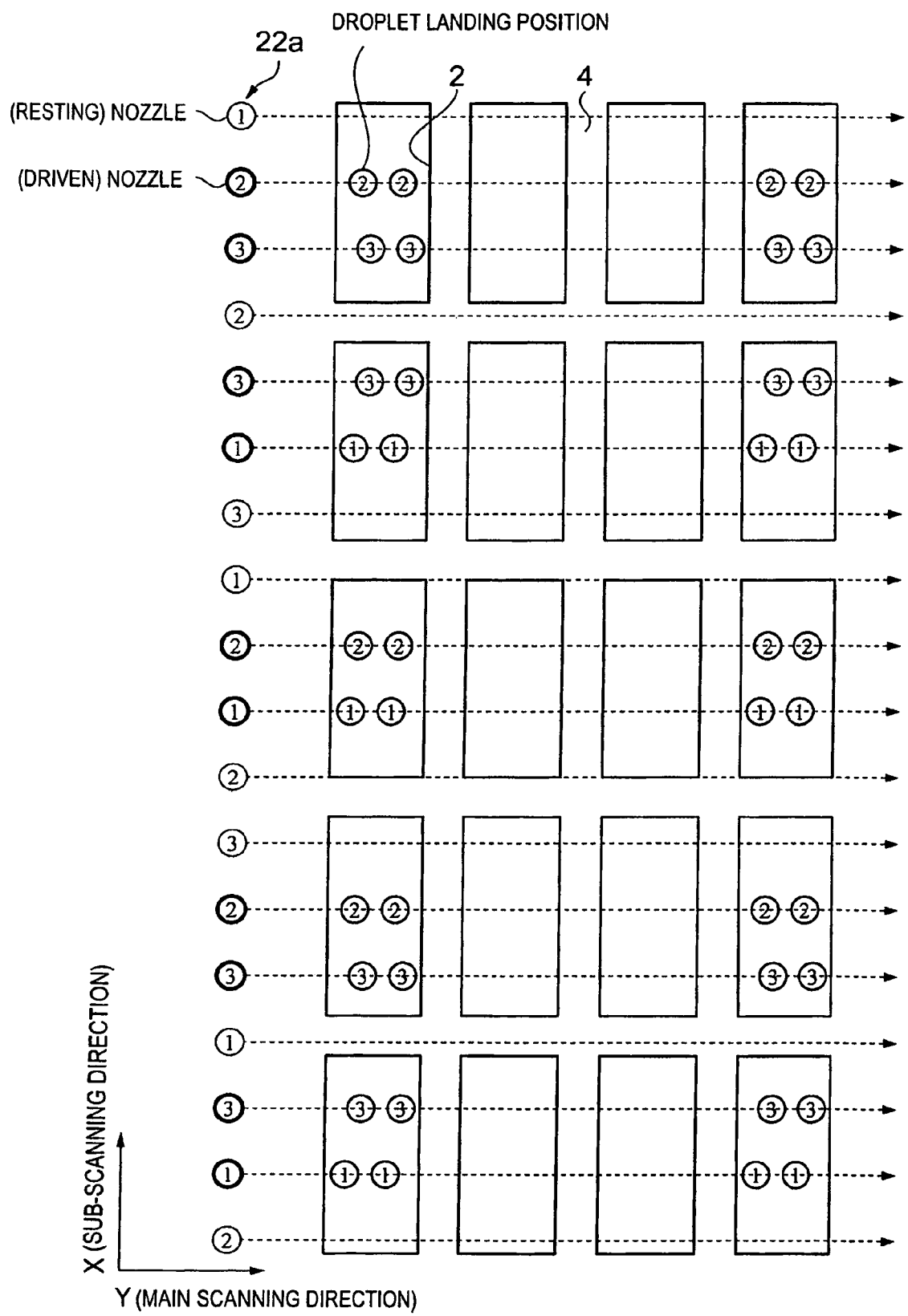
FIG. 12 is a diagram of the landing positions of the droplets and the group configuration in the nozzle row in accordance with a second embodiment of the present invention.

FIG. 12 is a diagram of the landing positions of the droplets and the group configuration in the nozzle row. FIG. 13 is a diagram of the relationship between drive waveform and control signal.

In FIG. 12, the nozzles in the nozzle row 22a make up first to third groups. Specifically, the nozzles numbered 1 to 3 in the drawing make up the first to third groups, respectively, and the order in which the group numbers are arranged in the layout direction (Y axis direction) of the nozzle row 22a is 1, 2, 3, 2, 3, 1, 3, 1, 2, . . . (repeating from that point on). The result of this group configuration is that nozzles belonging to the same group are not adjacent to each other, and the number of nozzles belonging to each group is substantially equal among the groups.

Figure 13:
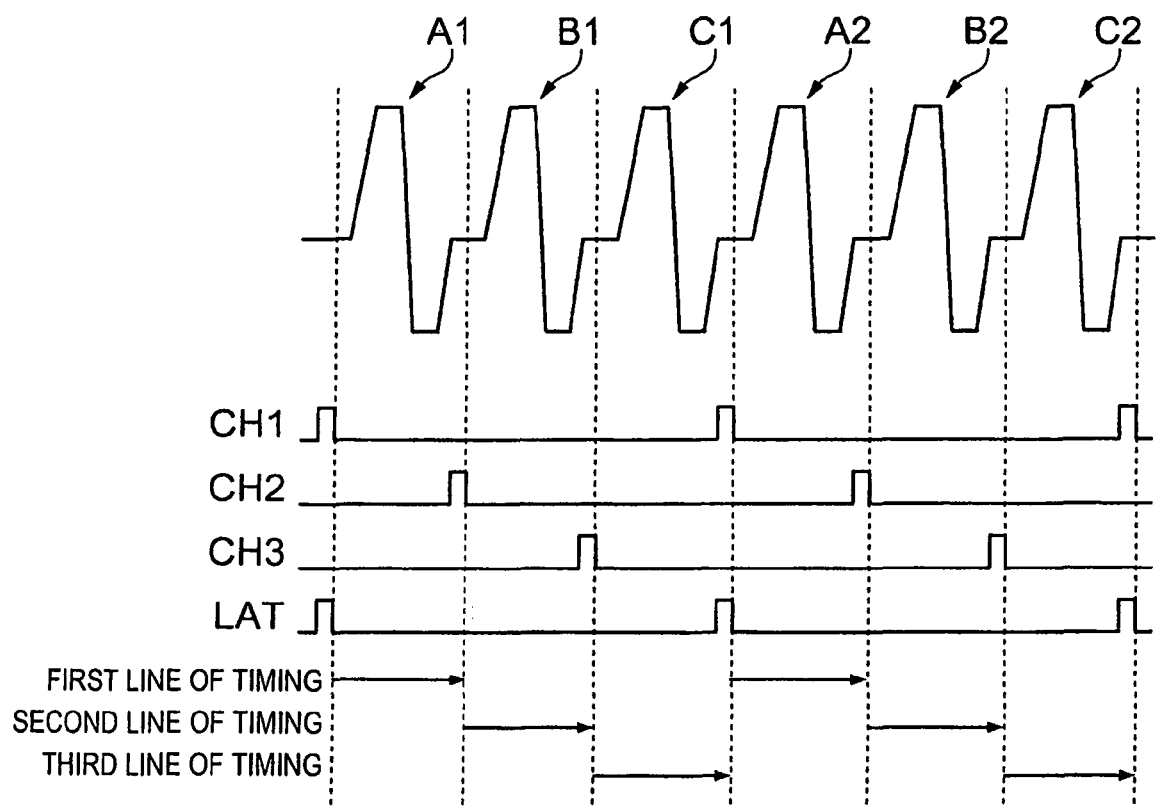
FIG. 13 is a diagram of the relationship between drive waveform and control signal in accordance with the second embodiment of the present invention.

In FIG. 13, some of the drive waveforms A1 to C2 and so on are selected according to the ON/OFF data (discharge data) for every nozzle latched at the timing of the control signal LAT, and supplied to piezoelectric elements that are provided corresponding to the nozzles. Droplets are discharged from the nozzles at the timing at which the drive waveforms are supplied. The drive waveforms A1 to C2 and so on have the same shape and size, and are designed so that they are supplied to the respective piezoelectric elements 29 (see FIG. 2), causing the specified amount of droplets to be discharged.

The selection of the drive waveforms pertaining to the nozzles of the first to third groups is performed by control signals CH1 to CH3 that specify the supply timing of the drive waveforms. Specifically, drive waveforms A1, A2, and so on are supplied to the piezoelectric elements of the nozzles in the first group at a first line of timing, drive waveforms B1, B2, and so on are supplied to the piezoelectric elements of the nozzles in the second group at a second line of timing, and drive waveforms C1, C2, and so on are supplied to the piezoelectric elements of the nozzles in the third group at a third line of timing.

Thus, in this embodiment, the drive waveform supplying time lines (the relative order based on the control signal LAT) are correlated individually, the result of which is that there can be no overlap in the discharge timing between groups. This favorably reduces mechanical crosstalk, and variance in characteristics between nozzles that would otherwise be caused by such crosstalk is relatively diminished. Also, since each line of timing is periodic, the discharge conditions are uniform between the various discharge timings, and the droplet amount can be stabilized in the scanning direction.

With this second embodiment, the nozzles of the nozzle row 22a make up three groups, so the number of nozzles per group is smaller than in the first embodiment, and the average spacing between nozzles within a group is greater than that in the first embodiment. Consequently, there is a greater reduction in mechanical crosstalk that is dependent on the proximity between nozzles. In general, the greater the number of groups into which the nozzles are divided, the greater the reduction in crosstalk tends to be, but it has been found by experimentation that the effect is substantially the same as long as there are three or more groups, so from the standpoint of ease of control, it was decided to use three groups in this embodiment.

Referring back to FIG. 12, with this discharge method, droplets are made to land along the scanning path of the nozzles in the film formation regions 2, under scanning of the nozzle row 22a and the glass substrate. Since the droplet discharge timing is divided by group by the method discussed above, the landing positions of the droplets can vary in the scanning direction between groups of corresponding nozzles, as shown in the drawing. The numerals 1 to 3 attached to the droplet landing positions in this drawing indicate the line number of the supply timing of drive waveforms pertaining to the discharge of the droplets (see FIG. 13).

In this embodiment, nozzles that perform discharge drive within the nozzle row 22a (indicated by the thick lines in the drawing; hereinafter referred to as driven nozzles) and nozzles that do not perform any discharge drive at all (indicated by the thin lines in the drawing; hereinafter referred to as resting nozzles) occur somewhat irregularly as a result of the positional relationship between the nozzles and the film formation regions 2. If we focus on the resting nozzles here and look at the order in which the groups are lined up, there is a regular pattern of 1, 2, 3, 1, 2, 3, . . . , and this means that the number and distribution density of nozzles (driven nozzles) constituting a group do not substantially differ greatly between groups, and remain substantially the same.

Figure 14:
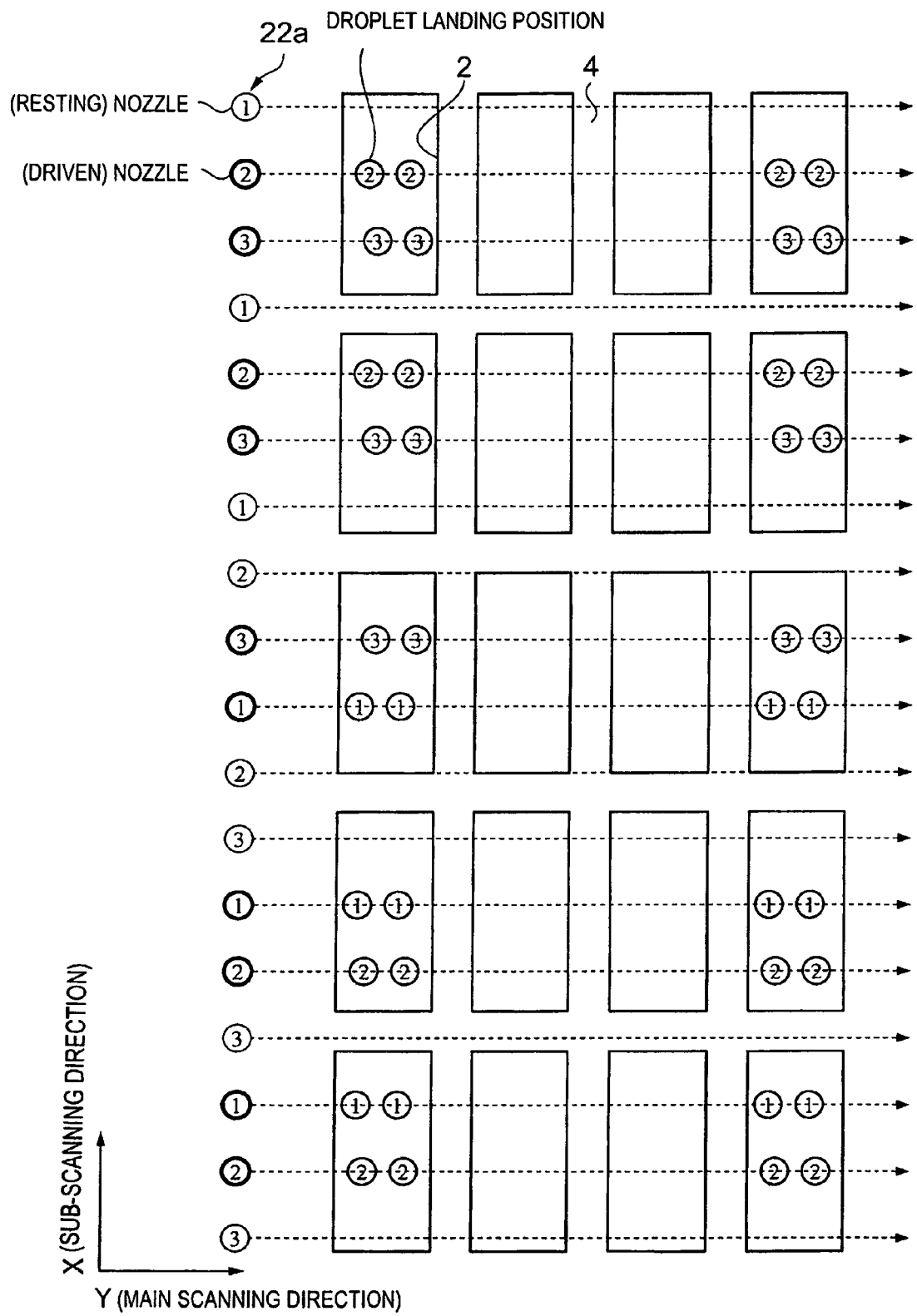
FIG. 14 is a diagram of a comparative example illustrating the effect of the second embodiment.

FIG. 14 is a diagram of a comparative example illustrating the effect of the second embodiment.

In this comparative example, the order of the group numbers in the layout direction of the nozzle row 22a (Y axis direction) is 1, 2, 3, . . . (repeating from that point on). Here, if we focus on the resting nozzles and look at the order of the groups, we see that the order is irregular at 1, 1, 1, 2, 2, 3, 3, 3, . . . , and this means that there is deviation between the groups in the number and distribution of substantial nozzles (driven nozzles) that make up the groups.

When groups are configured in this way, the effect of mechanical and electrical crosstalk between the nozzles varies from group to group, and this results in variance in the amount of discharge. Specifically, the group configuration in the second embodiment (see FIG. 12) was determined by taking this situation into account.

The above description focused on only the nozzle row 22a for the sake of convenience, but in actual practice the same discharge is also performed from the nozzle row 22b (see FIG. 2) at positions that complement the pitch of the nozzle row 22a. The total amount of discharge in a single scan is often insufficient to dispose the specified amount of liquid in the film formation regions 2 (to fill these regions), and in actual practice the specified amount is satisfied by repeating the scanning as discussed above for a plurality of times in the same film formation regions.

When a plurality of scans or discharge from a plurality of nozzles is performed in this way, it is preferable to distribute the discharge timing among the scans or the nozzles positioned over one film formation region 2, or, in other words, to prevent imbalance in the line of supply timing of the correlated drive waveforms. This is because if there is pronounced imbalance in the discharge timing for all of a plurality of film formation regions 2, this will cause the liquid to be disposed unevenly. Also, even within the same film formation region, if a plurality of nozzles are scanned at the same time, if there is imbalance in the discharge timing due to how the drive waveforms are selected, this can cause unevenness. The reason for this is believed to be that in a case in which discharge is performed non-continuously, as in this embodiment, the common channel 27 (see FIG. 2) is in a different state (such as pressure loss) in the first discharge and subsequent discharges after going through a period of rest, and this causes the discharge amount to fluctuate.

Third Embodiment

Next, a third embodiment of the present invention will be described through reference to FIGS. 15 and 16, focusing on the differences from the second embodiment.

Figure 15:
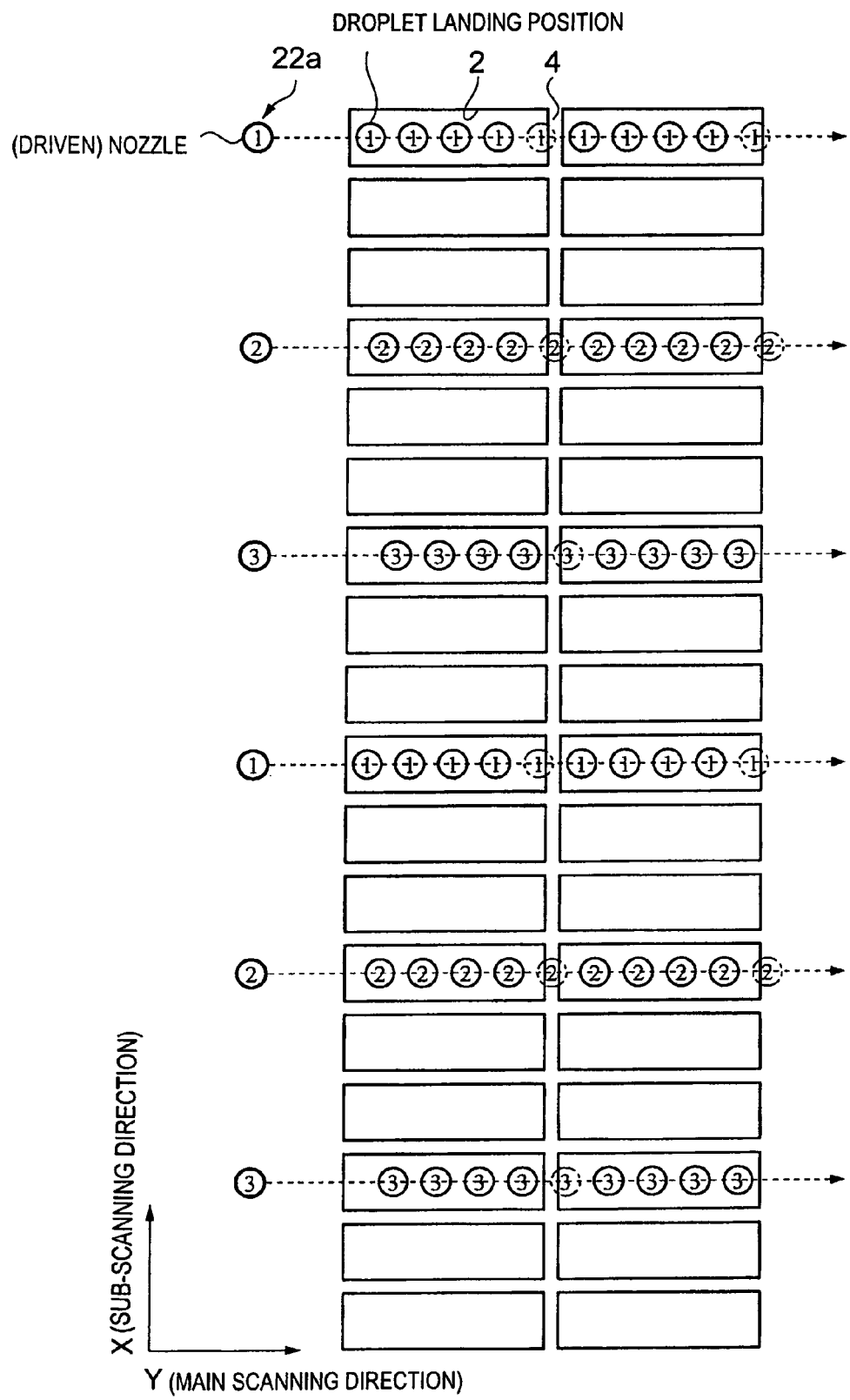
FIG. 15 is a diagram of the landing positions of the droplets and the group configuration in the nozzle row in accordance with a third embodiment of the present invention.

FIG. 15 is a diagram of the landing positions of the droplets and the group configuration in the nozzle row.

In this embodiment, as shown in FIG. 15, a writing method is employed in which the long-side direction of the film formation regions 2 is matched to the main scanning direction. The discharge of droplets to one of the film formation regions 2 is performed using a single nozzle.

The nozzles of the nozzle row 22a constitute first to third groups, and the nozzles belonging to the first to third groups discharge droplets at the timing of first to third lines, respectively (see FIG. 13). Just as in the case of the second embodiment, this reduces the crosstalk between nozzles, and variance in characteristics between nozzles that would otherwise be caused by such crosstalk is relatively diminished.

Also, since the supply timing of the drive waveforms pertaining to the groups (discharge timing) is periodic (see FIG. 13), the discharged droplets land equidistantly spaced in the main scanning direction, as shown in the drawing. The landing positions indicated by the imaginary lines at the positions overlapping with the partition component 4 are given for the sake of convenience to visually illustrate that the discharge timing is periodic, and do not indicate that the droplets actually land at these positions.

In this modification, a case was described in which the nozzle row 22a was arranged in the short-side direction of the film formation regions 2, and main scanning was performed in the long-side direction of the film formation regions 2, but the nozzle row 22a may be arranged in the long-side direction of the film formation regions 2, and main scanning performed in the short-side direction of the film formation regions 2.

Figure 16:
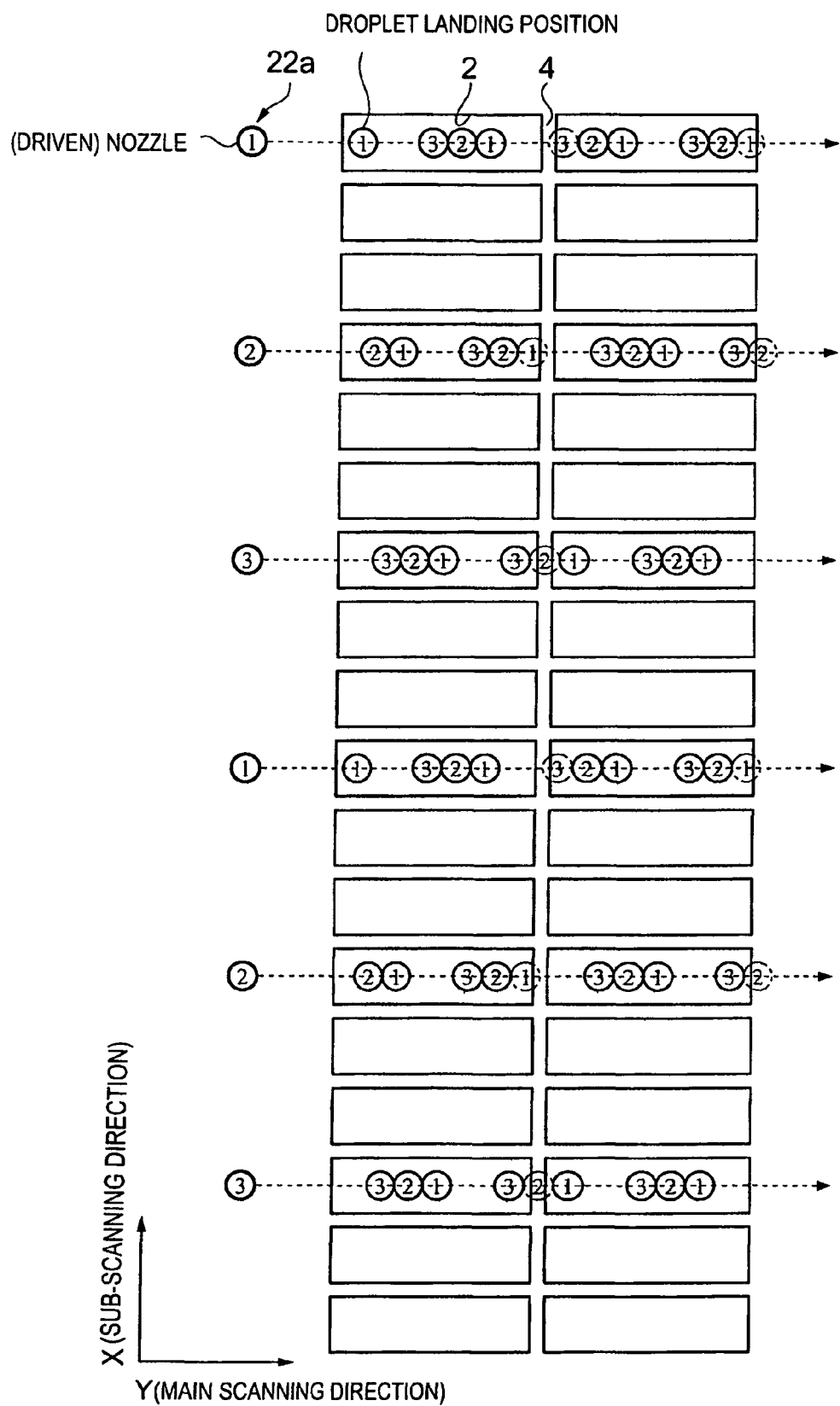
FIG. 16 is a diagram of a modification of the third embodiment.

FIG. 16 is a diagram of a modification of the third embodiment.

In this modification, the discharge timing of the groups is irregular, and if we focus on just one group, we see that the supply timing of drive waveform is correlated in the order of third line, second line, first line, . . . (repeating from that point on). In this case, since the discharge conditions vary with the discharge timing, there is fluctuation in the amount of discharge in the main scanning direction (the amount in which the liquid is disposed). This means that unevenness in the perpendicular component is added to unevenness in the disposition amount formed in the sub-scanning direction, which is attributable to variance in characteristics among nozzles, and that unevenness that is dispersed two-dimensionally is formed. This two-dimensionally dispersed unevenness is less visible than streaked (one-dimensional) unevenness, and as a result the unevenness is less noticeable.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A discharge method of discharging a liquid containing a functional material from a plurality of nozzles of a droplet discharge head to a plurality of film formation regions of a discharge medium in synchronization with a relative main scanning of the discharge medium and the droplet discharge head, the plurality of film formation regions being partitioned by a partition component, the discharge method comprising:

performing a first discharge step in which the liquid is discharged from a first set of nozzles, the first set of nozzles being selected among the plurality of nozzles so that the liquid does not hit the partition component and the liquid is not discharged simultaneously from adjacent nozzles positioned over the film formation regions; and performing a second discharge step in which the liquid is discharged from a second set of nozzles, the second set of nozzles being different from the first set of nozzles, the second set of nozzles being selected among the plurality of nozzles so that the liquid does not hit the partition component and the liquid is not discharged simultaneously from adjacent nozzles positioned over the film formation regions, both the first discharge step and the second discharge step being performed during a single main scanning, and at least a part of the liquid discharged during the first discharge step and at least a part of the liquid discharged during the second discharge step being disposed within the same one of the film formation regions.

2. The discharge method according to claim 1, further comprising
controlling a head driver to generate a drive waveform at a prescribed period to drive a plurality of energy generation units provided in the droplet discharge head so that the liquid is discharged from the nozzles according to the drive waveform, and
selectively energizing the energy generation units corresponding to the nozzles used in the first discharge step and the second discharge step according to the drive waveforms that are generated at different timings, respectively.

3. The discharge method according to claim 1, wherein
controlling a head driver to generate a plurality of drive waveforms in a single period to drive a plurality of energy generation units provided in the droplet discharge head so that the liquid is discharged from the nozzles according to the drive waveform, and
selectively energizing the energy generation units corresponding to the nozzles used in the first discharge step and the second discharge step according to the drive waveforms that are generated at different timings, respectively.

4. The discharge method according to claim 1, wherein
the performing of the first discharge step and the second discharge step includes discharging the liquid in the same film formation regions in the first discharge step and in the second discharge step.

5. A method of manufacturing a color filter having a partition component that divides a substrate into a plurality of film formation regions and a plurality of types of color element disposed in the film formation regions, the method comprising:
discharging a plurality of types of liquid containing different color element formation materials as functional materials from the nozzles of the droplet discharge head to the film formation regions to form the plurality of types of color element in accordance with the discharge method according to claim 1.

6. The discharge method according to claim 1, wherein
the first set of nozzles is selected among the plurality of nozzles based on a diameter of droplets discharged from the plurality of nozzles so that the droplets discharged from the first set of nozzles do not touch the partition component.

7. The discharge method according to claim 1, wherein
the second set of nozzles is selected among the plurality of nozzles based on a diameter of droplets discharged from the plurality of nozzles so that the droplets discharged from the second set of nozzles do not touch the partition component.

8. A discharge method of discharging a liquid from a plurality of nozzles onto a plurality of film formation regions of a discharge medium during a main scanning of a nozzle row of the nozzles with respect to the discharge medium, the plurality of film formation regions being partitioned by a partition component, the discharge method comprising:
dividing the nozzles in the nozzle row into a plurality of nozzle groups so that the liquid discharged from the nozzles does not hit the partition component and the nozzles included in the same nozzle group are not adjacent to each other; and
discharging the liquid from the nozzle groups at different timings that are synchronized to scanning during a single main scanning so that a part of the liquid discharged from different nozzle groups merges together on the discharge medium.

9. The discharge method according to claim 8, wherein
the dividing of the nozzles includes dividing the nozzles in the nozzle row into at least three nozzle groups.

10. The discharge method according to claim 8, wherein
the dividing of the nozzles includes dividing the nozzles in the nozzle row so that each of the nozzle groups includes substantially same number of the nozzles.

11. The discharge method according to claim 8, further comprising
generating a plurality of drive waveforms by time division,
selectively supplying part of the drive waveforms to a plurality of energy generation units disposed within the nozzles to discharge the liquid from the nozzles, and
selecting the drive waveforms according to the nozzle groups such that the drive waveforms do not overlap with each other between the nozzle groups.

12. The discharge method according to claim 11, wherein
the selecting of the drive waveforms includes selecting the drive waveforms so that the drive waveforms to be selected according to the nozzle groups form a periodic timing.

13. The discharge method according to claim 11, wherein
the selecting of the drive waveforms includes selecting the drive waveforms so that the drive waveforms to be selected according to the nozzle groups form a non-periodic timing.

* * * * *